(12) United States Patent
Horvat

(10) Patent No.: US 12,384,477 B2
(45) Date of Patent: Aug. 12, 2025

(54) VEHICLE STORAGE SYSTEM

(71) Applicant: HORVAT NOMINEES PTY LTD, Botany (AU)

(72) Inventor: Danny Andrew Horvat, Botany (AU)

(73) Assignee: Horvat Nominees Pty Ltd, New South Wales (AU)

( * ) Notice: Subject to any disclaimer, the term of this patent is extended or adjusted under 35 U.S.C. 154(b) by 185 days.

(21) Appl. No.: 18/040,996

(22) PCT Filed: Nov. 4, 2021

(86) PCT No.: PCT/AU2021/051296
§ 371 (c)(1),
(2) Date: Feb. 8, 2023

(87) PCT Pub. No.: WO2022/099351
PCT Pub. Date: May 19, 2022

(65) Prior Publication Data
US 2023/0303195 A1    Sep. 28, 2023

(30) Foreign Application Priority Data
Nov. 13, 2020  (AU) ................................ 2020904183

(51) Int. Cl.
| | | |
|---|---|---|
| *B62H 3/12* | (2006.01) | |
| *B62H 3/08* | (2006.01) | |
| *B66F 7/04* | (2006.01) | |
| *B66F 7/28* | (2006.01) | |
| *B66F 9/075* | (2006.01) | |

(Continued)

(52) U.S. Cl.
CPC ................. *B62H 3/12* (2013.01); *B62H 3/08* (2013.01); *B66F 7/28* (2013.01); *B66F 9/07559* (2013.01); *B66F 9/14* (2013.01); *B66F 9/18* (2013.01); *B66F 7/04* (2013.01)

(58) Field of Classification Search
CPC ......... B62H 3/08; B62H 3/12; B66F 9/07559; B66F 7/28; B66F 2700/123; B66F 7/02
See application file for complete search history.

(56) References Cited

U.S. PATENT DOCUMENTS

| | | | | |
|---|---|---|---|---|
| 2,135,765 A | * | 11/1938 | Paine | ........................ B66F 7/22 |
| | | | | 104/44 |
| 5,015,146 A | * | 5/1991 | Barnes | ...................... B66F 7/22 |
| | | | | 414/628 |

(Continued)

FOREIGN PATENT DOCUMENTS

| | | | |
|---|---|---|---|
| CA | 2209811 A1 | * | 1/1999 |
| CN | 114735613 A | * | 7/2022 |

(Continued)

*Primary Examiner* — Diem M Tran
(74) *Attorney, Agent, or Firm* — Sand, Sebolt & Wernow Co., LPA

(57) ABSTRACT

There is proposed vehicle storage apparatus, including a lifting jack having spaced apart lifting tines, a dolly being reversibly couplable to the lifting jack in a number of alternate positions, and a centre point device. The centre point device is used for determining the weight distribution along a longitudinal axis of the dolly when a vehicle is located thereon to assist in the suitable attachment of the dolly to lifting tines, to thereby inhibit tipping of the lifting jack when in the raised position or otherwise dislodgement of the vehicle stored thereon.

14 Claims, 21 Drawing Sheets

(51) Int. Cl.
  *B66F 9/14* (2006.01)
  *B66F 9/18* (2006.01)

(56) References Cited

U.S. PATENT DOCUMENTS

2012/0090921 A1   4/2012  Janz
2018/0362308 A1   12/2018 Chamoun
2021/0285488 A1*  9/2021  Yamamoto ................ B66F 7/28

FOREIGN PATENT DOCUMENTS

DE       19549205 A1   7/1997
GB         380151 A    9/1932
KR       20120015541 A 2/2012

* cited by examiner

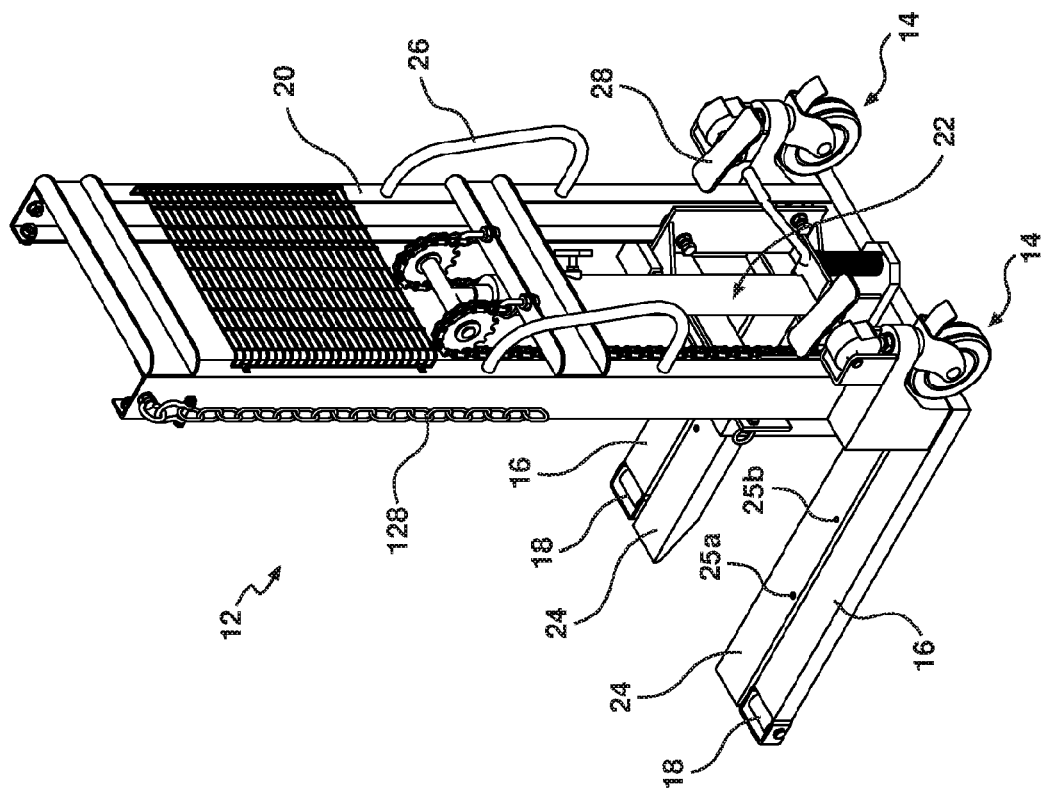
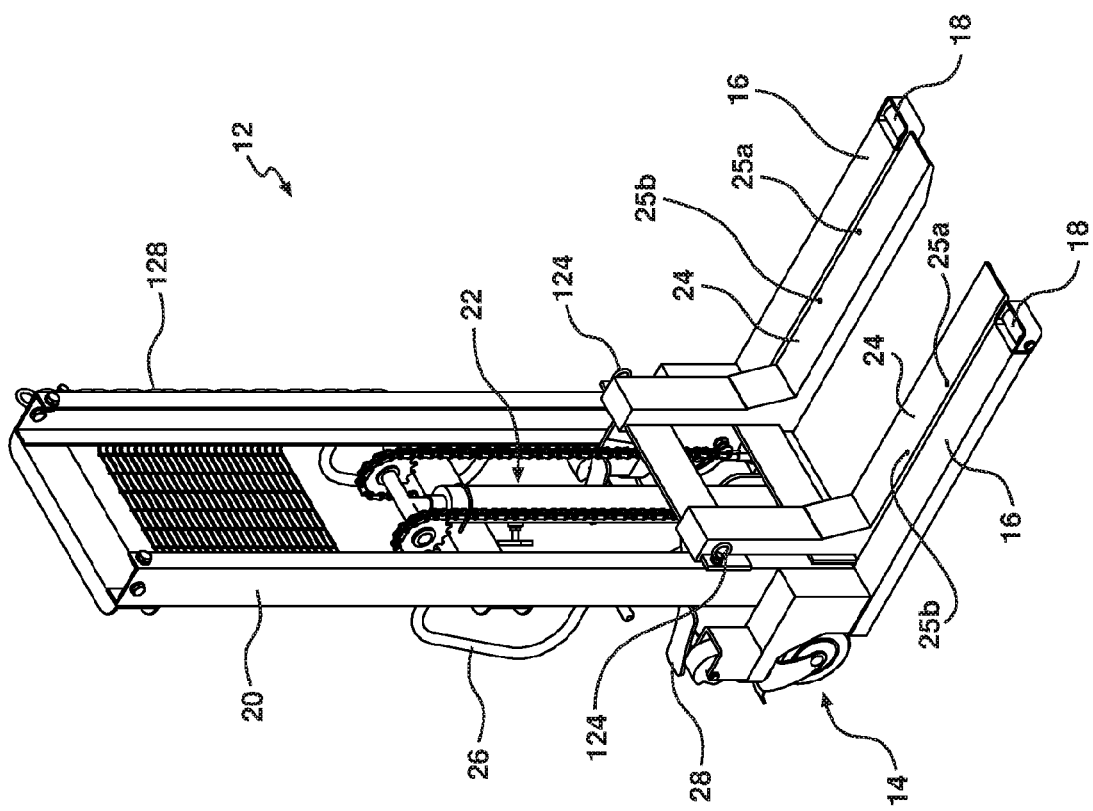

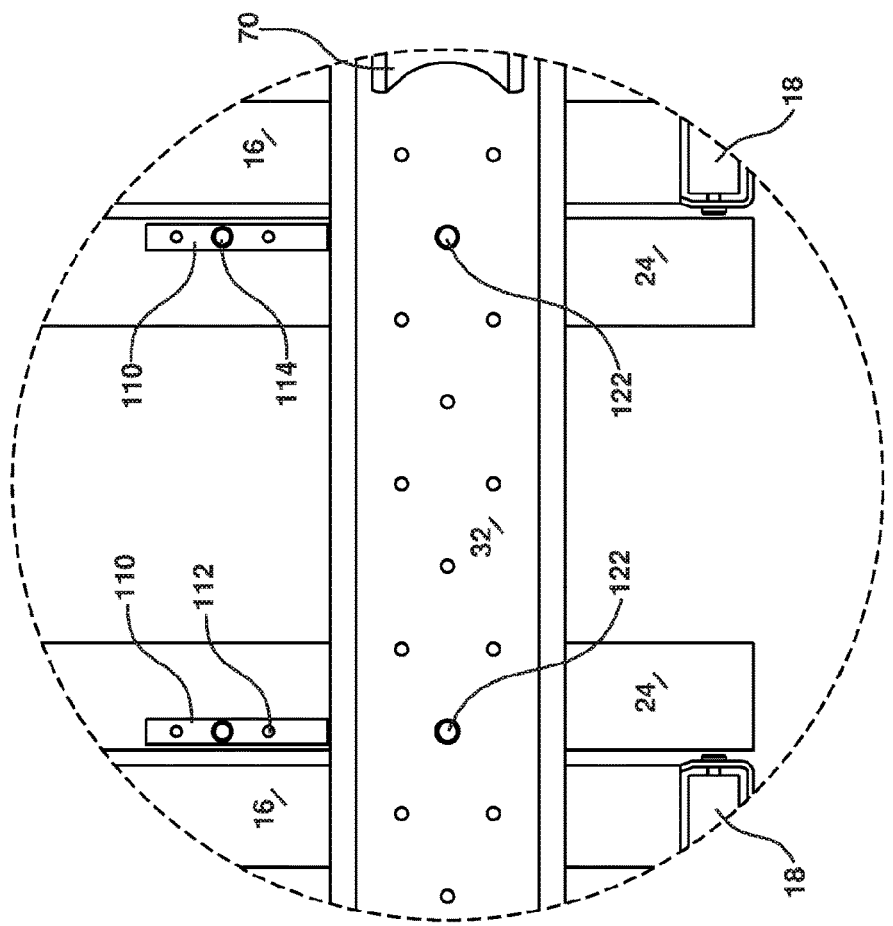
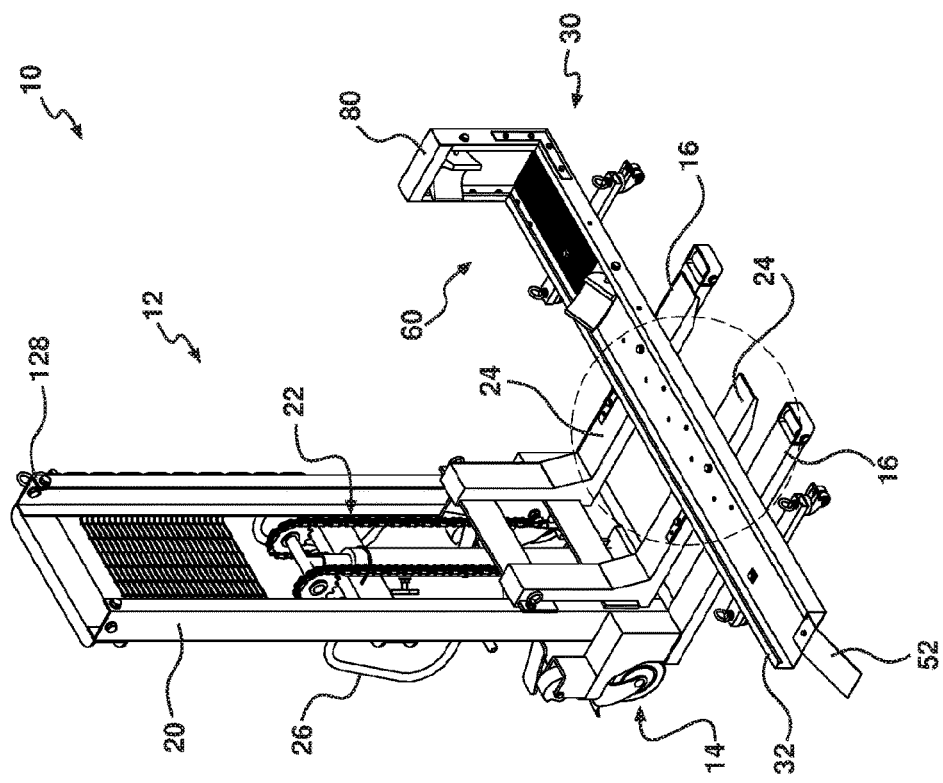
Figure 14
Figure 13

VEHICLE STORAGE SYSTEM

FIELD OF THE INVENTION

The present invention relates to an apparatus and method for vehicle storage and in particular for the storage of motorbikes.

BACKGROUND OF THE INVENTION

Motorbikes are popular as a means of transport and are often collected by motoring enthusiasts. For many enthusiasts their motorbike remains in storage for the majority of the time. Some enthusiast may also have multiple motorbikes that may be used infrequently.

This often entails the storage of the motorbike or multiple bikes in a garage or storage locker, which often have limited space. This may mean that the bikes need to be moved frequently to access other items being stored, which increases the risk of damaging the bike. In the case of collectable motorbikes any damage can significantly affect the enthusiast's investment.

There are various motorcycle bike lift benches and portable jack scissor lifts disclosed in the prior art, which can be used to lift a bike off a ground surface. This is typically done to assist a user in undertaking maintenance or repair. One such device is disclosed in International Application No. PCT/US2004/023641 (Thurm) that teaches a portable motorcycle lift that utilizes a scissor frame configuration. However, the bike is only lifted off the ground a small distance and the scissor frame obstructs access under the device for storage purposes.

There are storage racks available wherein motorbikes or other types of small land or water vehicle, can be positioned on a pallet and placed onto shelving. This however requires the use of a forklift, which in many cases may not be available in typical storage situations. Furthermore, these systems are large and typically are not suitable for garages or storage lockers. Accordingly, such systems are typically not suitable for most motorbike owners.

There are also various dolly devices disclosed in the prior art, which can be used to elevate, at least one wheel of a motorbike off the ground, such that the bike can be more easily manoeuvred into tight spaces.

One such dolly is disclosed in U.S. Patent Application No. 20020109130, in the name of TC Development and Design, Inc., which teaches a portable motorcycle lift that permits the elevation of the front and rear ends of the motorcycle independently of one another. Another dolly system is disclosed in International Application No. PCT/AU2015/000428, in the name of Black MC Pty Ltd, which discloses a dolly frame being supported on multidirectional wheels. The dolly frame can be pivoted to engage a tyre of a motorbike and then lowered to raise a wheel of the bike to assist in manoeuvring the vehicle for storage.

These systems do not however enable the utilisation of the vertical space within a storage area to assist in storage of one or more motorbikes.

The term "vehicle" used throughout the description and claims should be given its broadest definition and includes motorbikes, quad bikes, motorised trikes or other types of small motorised land vehicles or watercraft, such as but not limited to, jet skis and other personal watercraft (PWC), which are also often stored in garages or storage lockers.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

It is an object of the present invention to provide an apparatus for use in the storage of a vehicle, at a height above the ground, which is configured to inhibit tipping thereof. Further objects of the present invention are to overcome at least some of the aforementioned problems, or at least provide the public with a useful alternative. The foregoing objects should not necessarily be considered as cumulative and various aspects of the invention may fulfil one or more of the above objects.

In one aspect of the invention, but not necessarily the broadest or only aspect, there is proposed a vehicle storage apparatus, including:
a lifting jack having spaced apart lifting tines;
a dolly being reversibly couplable to the lifting tines in a number of alternate positions; and
a centre point device for determining the weight distribution along a longitudinal axis of the dolly when a vehicle is located thereon, to assist in the selection of one of the number of alternate positions for the suitable attachment of the dolly to the lifting tines, to thereby inhibit tipping of the lifting jack when the lifting tines are in the raised position or otherwise dislodgement of the vehicle stored thereon The reader will appreciate that the centre point or fulcrum of the dolly will vary depending upon the vehicle being stored thereon and the particular configuration of the vehicle, which may vary over time.

Preferably, the dolly is movable laterally relative the lifting tines of the lifting jack and reversibly couplable to the lifting lines, once a longitudinal centre point of the dolly with the vehicle positioned thereon is determined.

The dolly may be coupled to, or couplable to the lifting tines, using a nut and bolt that are engageable through co-axially alignable holes, or a clamp mechanism, or a clip may be provided such that the dolly can be coupled to, or couplable to the lifting jack in a variety of positions depending upon the weight distribution of the vehicle being supported on the dolly.

The dolly and centre point device are preferably separate devices. However, in an alternate form, the centre point device may form part of the dolly and may be moveable between a downwardly extending position when it is being used to determine the weight distribution and a disengaged or retracted position when the vehicle is being supported on caster wheels or sliders of the dolly. In still another form the caster wheels or sliders may be retractable to expose the centre point device such that it can be used to determine weight distribution, along the longitudinal axis or length of the dolly.

As the reader will appreciate the longitudinal centre point will change depending upon what vehicle is being stored. Furthermore, the centre point of a particular vehicle may change depending upon the amount of fuel in the fuel tank, or if accessories are added. Accordingly, the dolly is reversible fixable to the lifting tines so that the longitudinal centre point can be reassessed and the dolly can be repositioned prior to storage.

In another aspect of the invention there is proposed a motorbike storage apparatus, including:

a dolly having a plurality of generally vertical primary holes extending therethrough, the dolly being supportable on wheels or slides, and configured to hold a motorbike thereon;

a lifting jack including spaced apart lifting tines, each of the lifting tines including at least one generally vertical secondary hole extending therethrough; and a centre point device, being configured to selectively support the dolly thereon, for use in determining a weight distribution along a longitudinal axis of the dolly, whereby at least two of the vertical primary holes are identified for coaxial alignment with respective secondary holes extending through the lifting tines, to thereby enable passage of a respective fixing means therethrough, wherein the dolly is fixedly connectable to lifting tines to thereby provide a generally even distribution of weight to inhibiting tipping of the apparatus or otherwise dislodgement of the vehicle stored thereon.

The lifting jack may be a mobile unit having lockable caster wheels, ground engaging members with rollers, a vertical frame and lifting mechanism for raising the spaced apart lifting tines.

Alternatively, the lifting jack may comprise a frame attachable to a wall or other vertical support, and lifting tines movably connected thereto.

The lifting mechanism may include a hydraulic or pneumatic system for assisting in the raising of the dolly/motorbike. The lifting mechanism may also include chains, tracks and other components that would be obvious to a person skilled in the art, and which will not be described in detail.

The apparatus preferably includes a locking member, which is reversibly engageable to hold the lifting tines in a raised positioned. The locking member may inhibit unintentional lowering of the lifting tines when the motorbike is being supported thereon. As the reader will appreciate, this is important to prevent the lifting tines coming into contact with an object being stored or positioned below the lifting tines, such as another motorbike or vehicle.

Preferably, the lifting jack includes a wheel lock or locks for the caster wheels. In one form, the wheel lock or locks may be automatically activated when the lifting tines are raised. This thereby prevents the lifting jack from being moved when the lifting tines are in the raised position. If the lifting jack were to be moved when a motorbike was being stored at a height there would be an increased risk that the apparatus may topple over due to the weight distribution or sideways pressure being applied.

In one form, the dolly comprises a plank being affixed to two spaced apart cross members. Each cross-member includes a caster wheel assembly at opposite ends thereof, such that the plank is effectively supported on four caster wheels. Each cross-member may further include tie-down eyelets for the attachment of ratchet straps or the like, to assist in securing the motorbike when being stored.

The plank may include a movable ramp at a first end, and a wheel engaging member at an opposite second end. Preferably, the plank is generally L-shaped and comprises an upwardly open channel adjoining a vertical end stop at the second end.

In one form the wheel engaging member may comprise a rearwardly open support member, which is fixedly attached to the vertical end stop of the plank. The rearwardly open support member is configured to retain a front portion of the front wheel of the motorbike. The wheel engaging member may further include a pivotable support member which is held at least partly within the upwardly open channel. In use as the motorbike is rolled up the ramp and along the upwardly open channel of the plank, the front wheel rolls over the pivotable support member and abuts the rearwardly open support member. As the reader should appreciate the pivotable support member, pivots as the wheel rolls thereover, such that it engages a rear portion of the front wheel. The plank may also include a non-slip surface to assist in holding the front wheel in place, when positioned within the wheel engaging member.

Furthermore, four threaded eyelet bolts may be positioned on either side adjacent the front wheel being configured to engage through holes in the plank. In one form the reader will appreciate that a three point wheel locking assembly is envisaged and provided to hold a front wheel.

It is envisaged that the front wheel of the motorbike will engage the wheel engaging member.

The pivotable support member may be repositioned along the upwardly open channel of the plank to accommodate different diameter wheels.

The wheel engaging member may also comprise a part of the plank which is modified or attached thereto, to assist in retaining the wheel of the motorbike.

The plurality of primary holes extended vertically through the plank of the dolly.

A guide member may be slidably coupled to or configured to engage with the plank. In a preferred form, the guide member clips over an edge of the upwardly open channel and is configured to slide therealong. The guide member may be used in conjunction with the centre point device to determine which of the plurality of primary holes are to be used to coaxially align the at least one secondary hole through the lifting tines.

The centre point device in one form comprises a roller having ends being enlarged to abut respective sides of the plank. In this way the centre point device can be placed under the plank and the dolly can be moved backwards and forwards in a longitudinal direction to determine the weight distribution and lateral centre point line of the dolly with motorbike supported thereon. The enlarged ends of the centre point device ensure corrected placement under the plank and inhibit the centre point device from rolling sideways out from under the dolly when in use.

The diameter of the centre point device is preferably greater than the distance between the underside of the plank and the caster wheels such that the caster wheels are raised off the ground when the plank is supported on the centre point device.

Once the dolly has been moved such that the centre point device is positioned such that there is even distribution of weight on either side, the guide member can be moved whereby a centre line of the guide aligns and is positioned vertically above an axis of rotation of the centre point device. In one form, the length of the guide member is the same as the distance between the secondary holes of the adjacent lifting tines. This means that the user can then mark or take note of the primary holes adjacent each end of the guide member, which can be used to attach the dolly to the lifting tines, to thereby evenly distribute the weight of the dolly/bike.

An L-shape bracket may be used to assist in the attachment of the dolly to the lifting tines, in that it can be used as a back support for corrected positioning of the plank relative to the lifting tines so that the holes can be more easily aligned.

In another aspect of the invention there is proposed a method of storing a motorbike, including the steps of:

providing a motorbike storage apparatus, in accordance with any one of the above aspects, including, a dolly reversibly couplable to a lifting jack in a number of alternate positions, and a centre point device;

positioning the motorbike on a plank of the dolly;

lifting the dolly using the lifting jack;

positioning the centre point device under the plank of the dolly;

lowering the dolly using the lifting jack until the plank rests on the centre point device;

moving the dolly in a longitudinal direction to determine generally the centre point of the motorbike and dolly, such that the weight is even distributed on either side of the centre point device;

marking or otherwise noting the centre point/fulcrum and other related measurements on the plank of the dolly;

lifting the dolly off the centre point device using the lifting jack;

removing or moving the centre point device;

using the markings of the centre point or other related measurement, to fix the plank of the dolly to the lifting jack, such that when the dolly and motorbike are raised by the lifting jack the motorbike storage apparatus is inhibited from tipping or otherwise dislodgement of the vehicle stored thereon.

The above method preferably includes the step of securing the motorbike to the dolly, using at least one wheel engaging member, and/or clamps, and/or straps and/or other reversible attachable member for holding the motorbike in place relative to the dolly.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings, FIG. 1 is a front perspective view of one embodiment of a lifting jack of the motorbike storage apparatus of the present invention;

FIG. 2 is a rear perspective view of the lifting jack of FIG. 1;

FIG. 13 is a perspective view of FIG. 12, illustrating attachment of bolts;

FIG. 14 is an enlarged top view of the area indicated on the FIG. 13, showing attachment of the brackets and the position of the mounting holes of the brackets and the dolly affixed to the tines;

DETAILED DESCRIPTION OF THE ILLUSTRATED AND EXEMPLIFIED EMBODIMENTS

Figure 3:
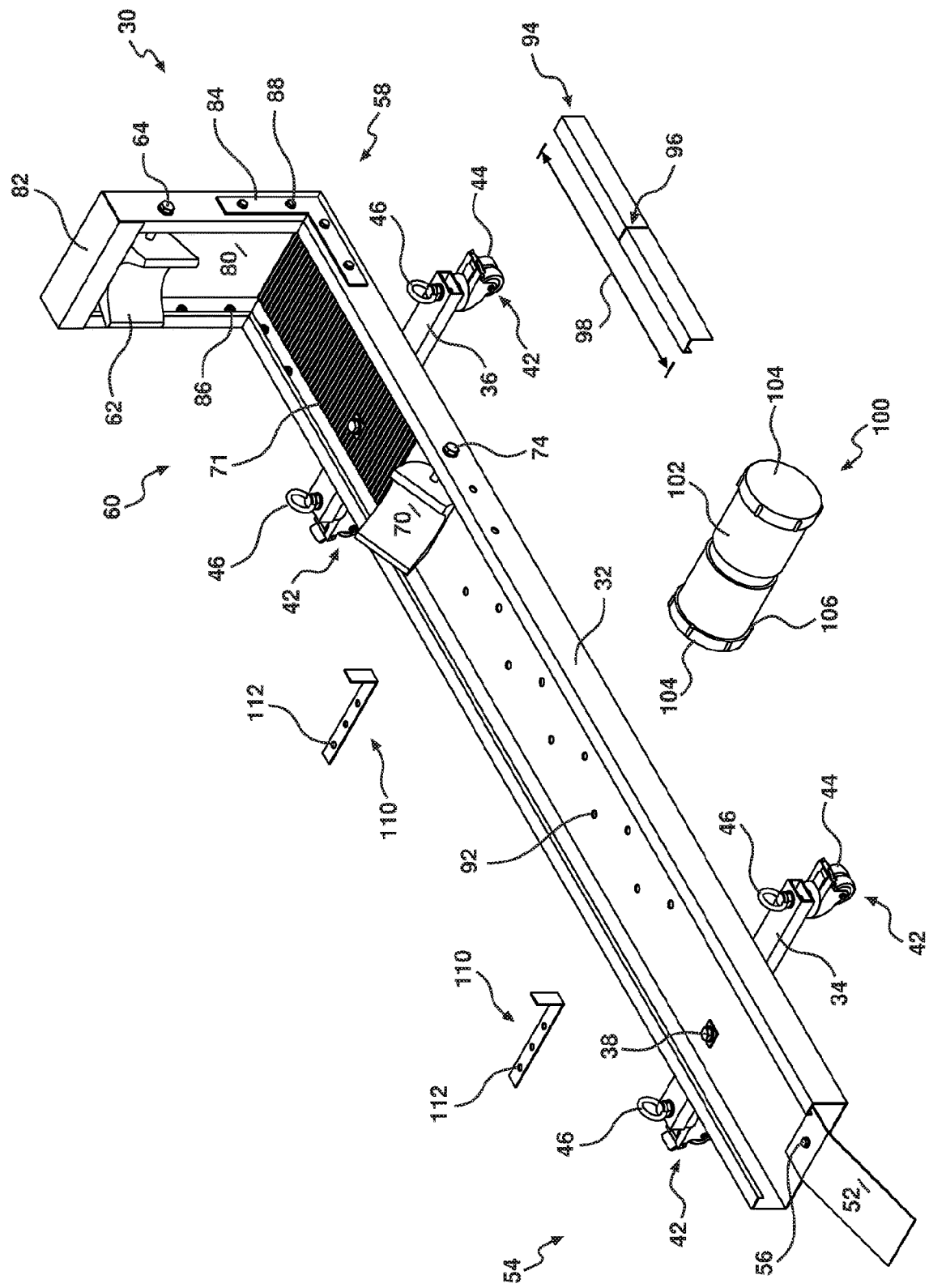
FIG. 3 is a perspective view of a dolly, centre point device, and guide member of the motorbike storage apparatus.

Similar reference characters indicate corresponding parts throughout the drawings. Dimensions of certain parts shown in the drawings may have been modified and/or exaggerated for the purposes of clarity or illustration.

Referring to the drawings for a more detailed description, there is illustrated a motorbike storage apparatus 10, demonstrating by way of examples, arrangements in which the principles of the present invention may be employed.

As illustrated in FIGS. 1 and 2, the motorbike storage apparatus 10 includes a lifting jack 12 being in the present embodiment a mobile unit, having lockable caster wheels 14, ground engaging members 16 with rollers 18, a vertical frame 20, a lifting mechanism 22, handle actuator 23, including a hydraulic cylinder valve, spaced apart lifting tines 24 having secondary holes 25a and 25b, handles 26 and a brake actuator 28. The lifting jack 12 is of a configuration that is known in the prior art and will not be described in detail, since the skilled addressee will understand the configuration and operation of the device.

Figure 4:
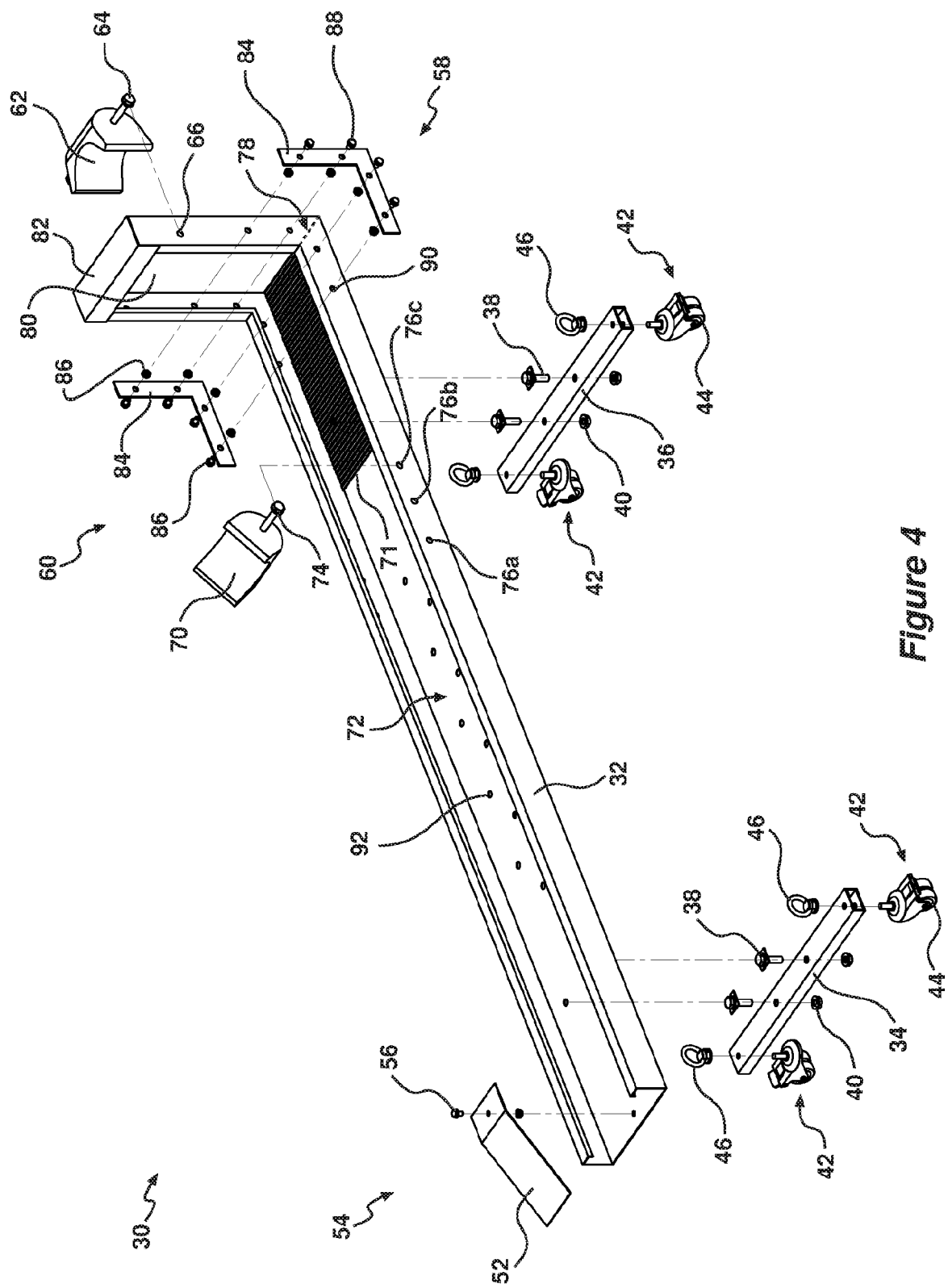
FIG. 4 is an exploded view of the dolly of FIG. 3.

Turning to FIGS. 3 and 4, there is illustrated a dolly 30 which is couplable or attachable to the lifting tines 24 of the lifting jack 12. The dolly 30 of the present embodiment comprises a plank 32 being affixed to two spaced apart cross members 34, 36, by way of bolts 38 and nuts 40. Each cross-member 34, 36 includes a caster wheel assembly 42 at opposite ends thereof, such that the plank 32 is supported on the four lockable caster wheels 44.

Figure 15:
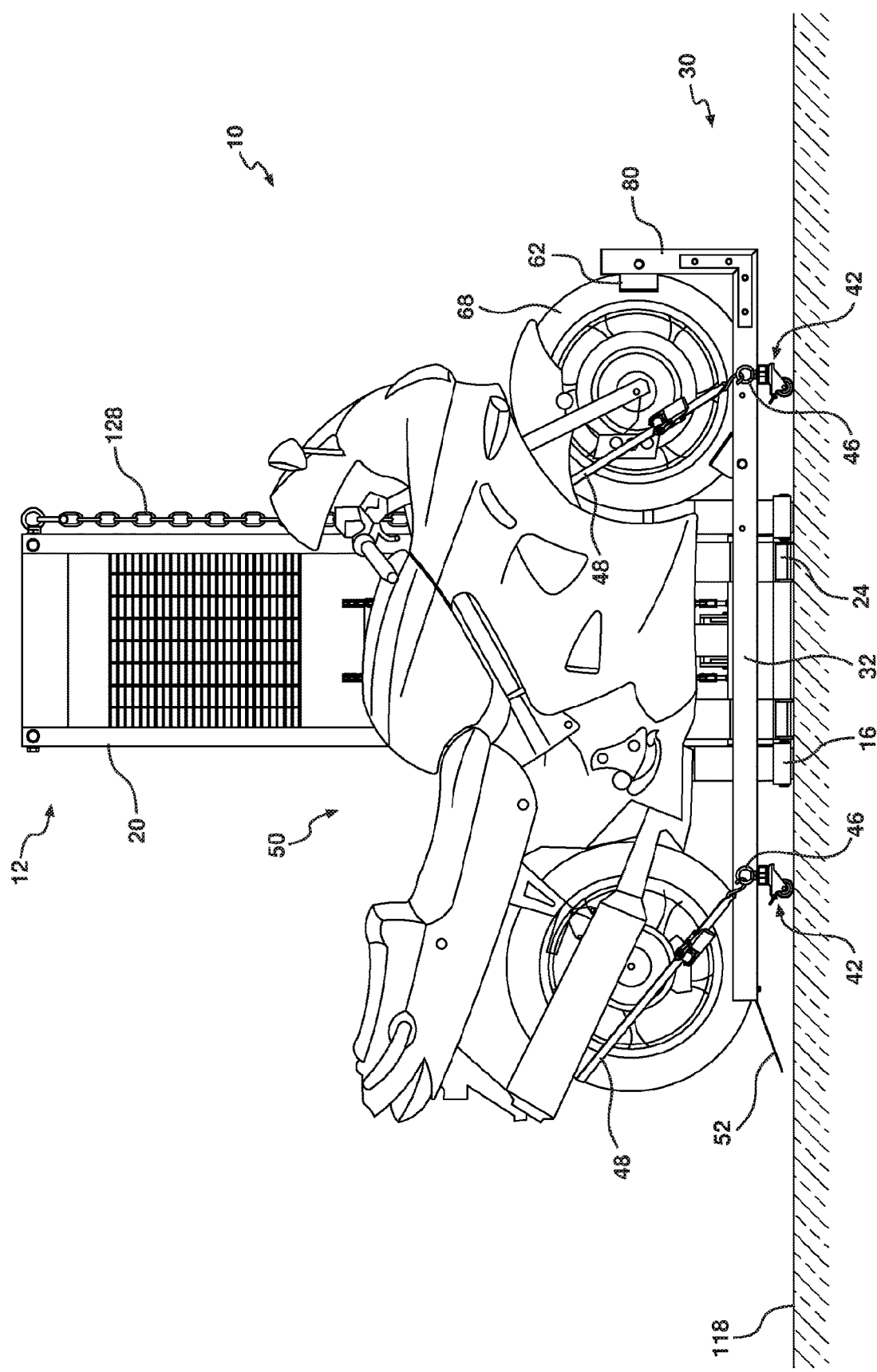
FIG. 15 is a front view of the apparatus of FIG. 11, illustrating the dolly attached to the tines of the lifting device.
Figure 17:
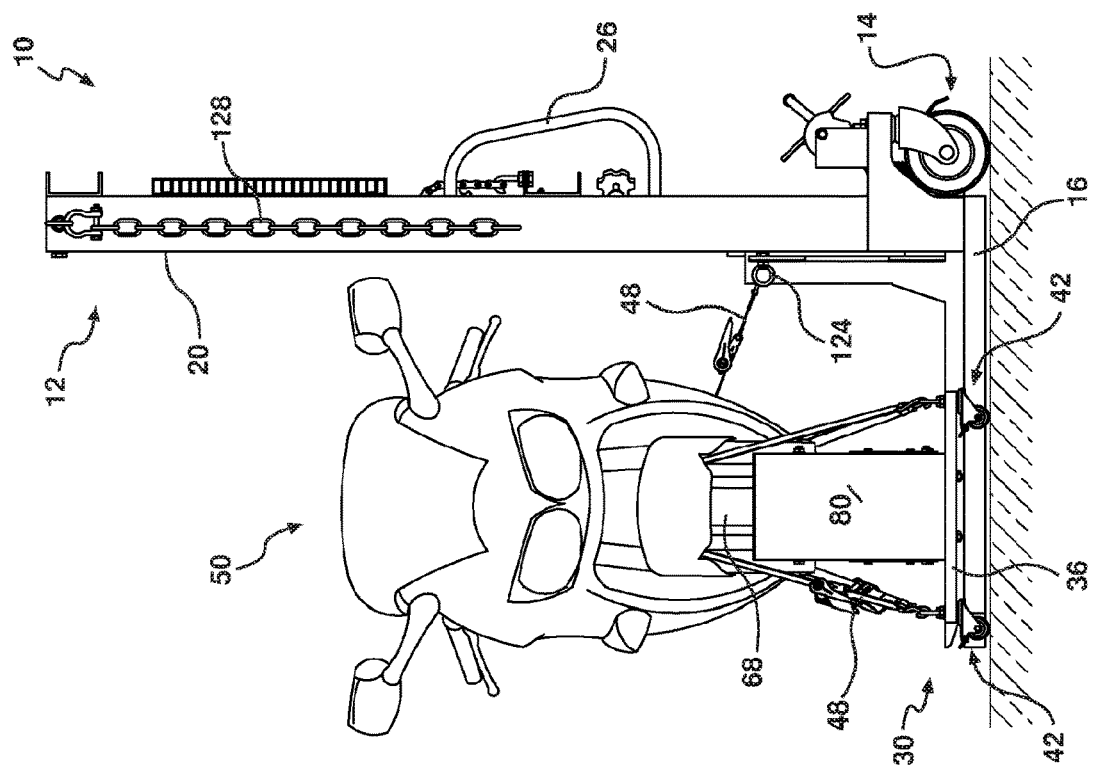
FIG. 17 is an opposite side view of FIG. 16.
Figure 16:
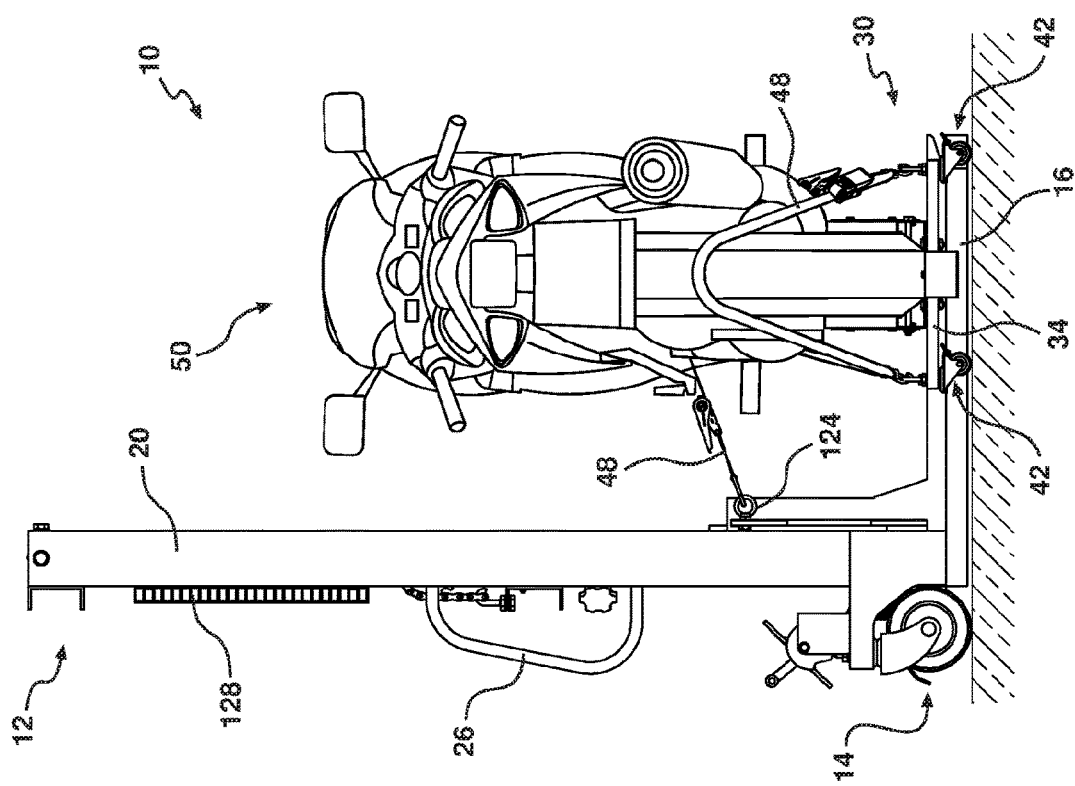
FIG. 16 is a side view of apparatus and motorbike of FIG. 15 illustrating the use of ratchet straps.

Each cross-member 34, 36 further includes tie-down eyelets 46 for the attachment of ratchet straps 48, as illustrated in FIGS. 15 to 17, to assist in securing the motorbike 50 to the apparatus 10 when being stored. The ratchet straps 48 may be attached as soon as the motorbike 50 has been positioned on the plank 32, or at least prior to raising the motorbike 50 to a height above the ground.

The cross-members 34, 36 may be constructed from aluminium box section and have a length of 498 mm and a cross-sectional profile of 50 mm×25 mm. The cross-members 34, 36 are mounted at either end of the plank 32 and bolted directly through selected 12 mm holes 92.

At each end of the cross-member 34, 36 respective 95 kg rated multi directional trolley wheels/caster wheel assembly 42 are positioned with brakes fitted. The total height off the ground from the base of the plank 32 in the present embodiment is 95 mm, providing 5 mm clearance above the members 16, 24 of the apparatus 10. This is so the plank 32 is able to be manoeuvred interposition above locating bolt holes 92 on lifting tines 16 ready for lifting. The trolley wheels 42 are bolted onto the aluminium section 34 or 36 using 10 mm eyelet bolts 46 which provide securing points for safety ratchet straps 48 used to secure a bike 30 on to the plank 32.

The plank 32 has a ramp 52 attachable at a first end 54, by way of a screw/bolt 56. The first central hole 92 at entry of plank 32, is in the present embodiment positioned 25 mm centre from the leading-edge and is done to accommodate the detachable ramp 52 for loading and unloading a bike or vehicle.

The opposite second end 58 of the plank 32 includes a wheel engaging member 60. The wheel engaging member 60 comprises a rearwardly open support member 62, which in the present embodiment is attached at the second end 58 of the plank 32, by way of pin 64 which extends through apertures 66.

Figure 6:
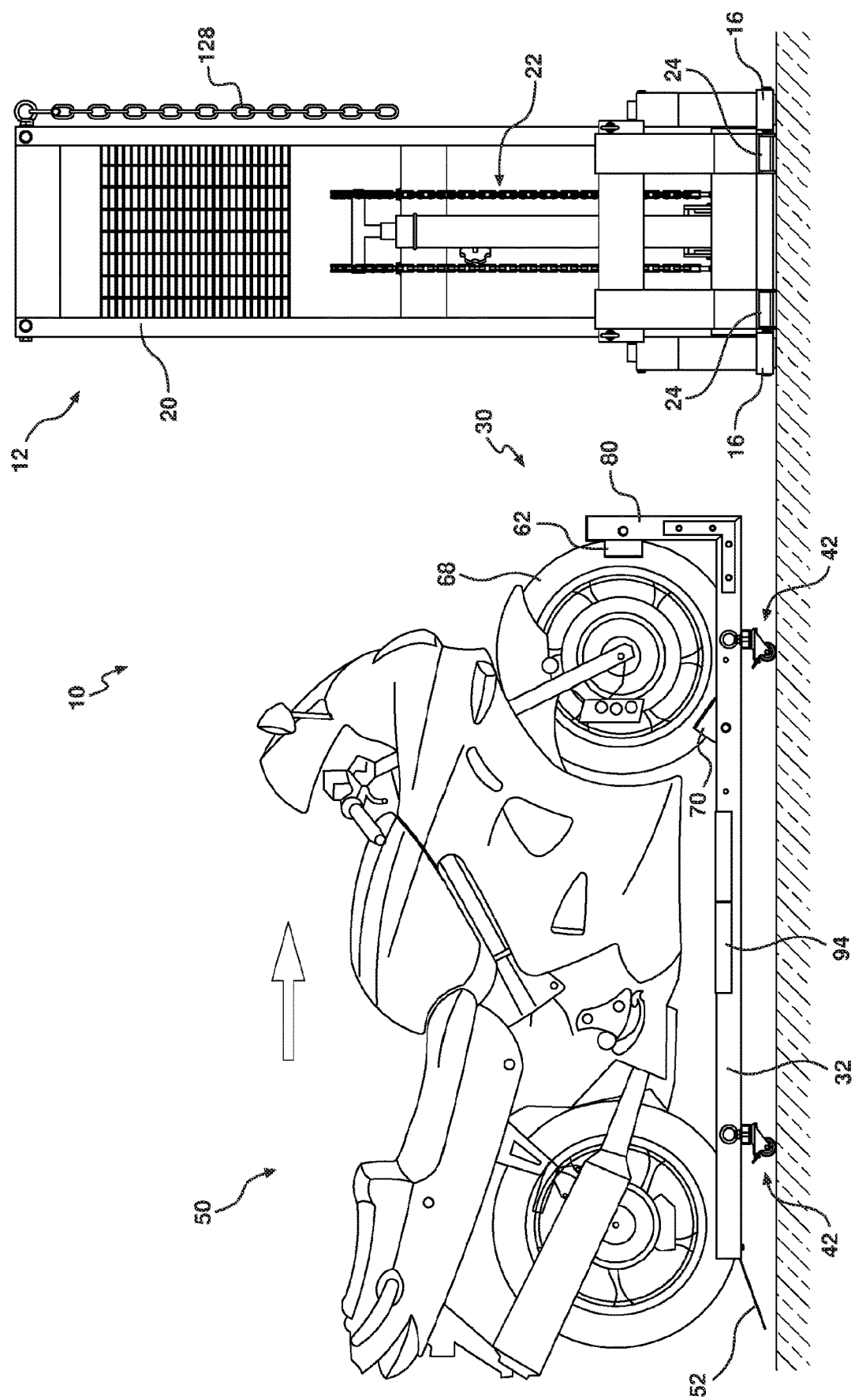
FIG. 6 is a front view of the lifting jack of FIG. 1 with motorbike positioned on the dolly.

The support member 62 is configured to retain a front of the wheel 68 of the motorbike 50, as shown in FIG. 6 and is able to pivot slightly around pin 64 to compensate for different sized wheels 68.

The wheel engaging member 60 further includes a pivotable wheel capturing member 70, which is held at least partly within the upwardly open channel 72 of the plank 32. The pivotable wheel capturing member 70 is held in place by way of pin 74, which is configured to alternatively engage cooperating apertures 76a, 76b, 76c, depending upon the size of the wheel 68.

In use, the four caster wheels 44 are locked and the motorbike 50 is rolled up the ramp 52 and along the upwardly open channel 72 of the plank 32, in the direction of the arrow in FIG. 6. The front wheel 68 rolls over the pivotable wheel capturing member 70 and abuts the rearwardly open support member 62. As the reader should appreciate, the pivotable support member pivots as the wheel rolls thereover such that it engages a rear of the wheel, once it has passed thereover. The plank 32 may also include a non-slip surface 71 to assist in holding the front wheel in place, which positioned within the wheel engaging member or bolts that pass through selected holes 92 on either side of the front wheel to thereby hold the wheel in place.

In the present embodiment the plank 32 is formed by a length of open channel which is cut at broken line 78, and folded to form the upwardly open channel 72 and adjoining vertical end stop 80, with an upper end 82 that is cut and folded. In the present embodiment L-shaped bracket 84 are attached using nuts 86 and bolts which engage apertures 90, to thereby fix the vertical end stop 80 relative to the upwardly open channel 72.

The height of the vertical end stop 80 is in the present embodiment 420 mm, and is configured to stop the bike moving forward and is also used to strengthen the plank 32 as it holds the edge of the front tyre in place at 62. The upper end 82 vertical end stop 80 acts as a stiffener and may include indicia thereon to identify the source of the invention. The plank 32 is bent at a 90 degree angle and welded along the 45 degrees outline 78.

The upwardly open channel 72 and end stop 80 further includes a plurality of primary holes 92, extended vertically through the plank 32, the purpose of which will be described in detail below.

Figure 5:
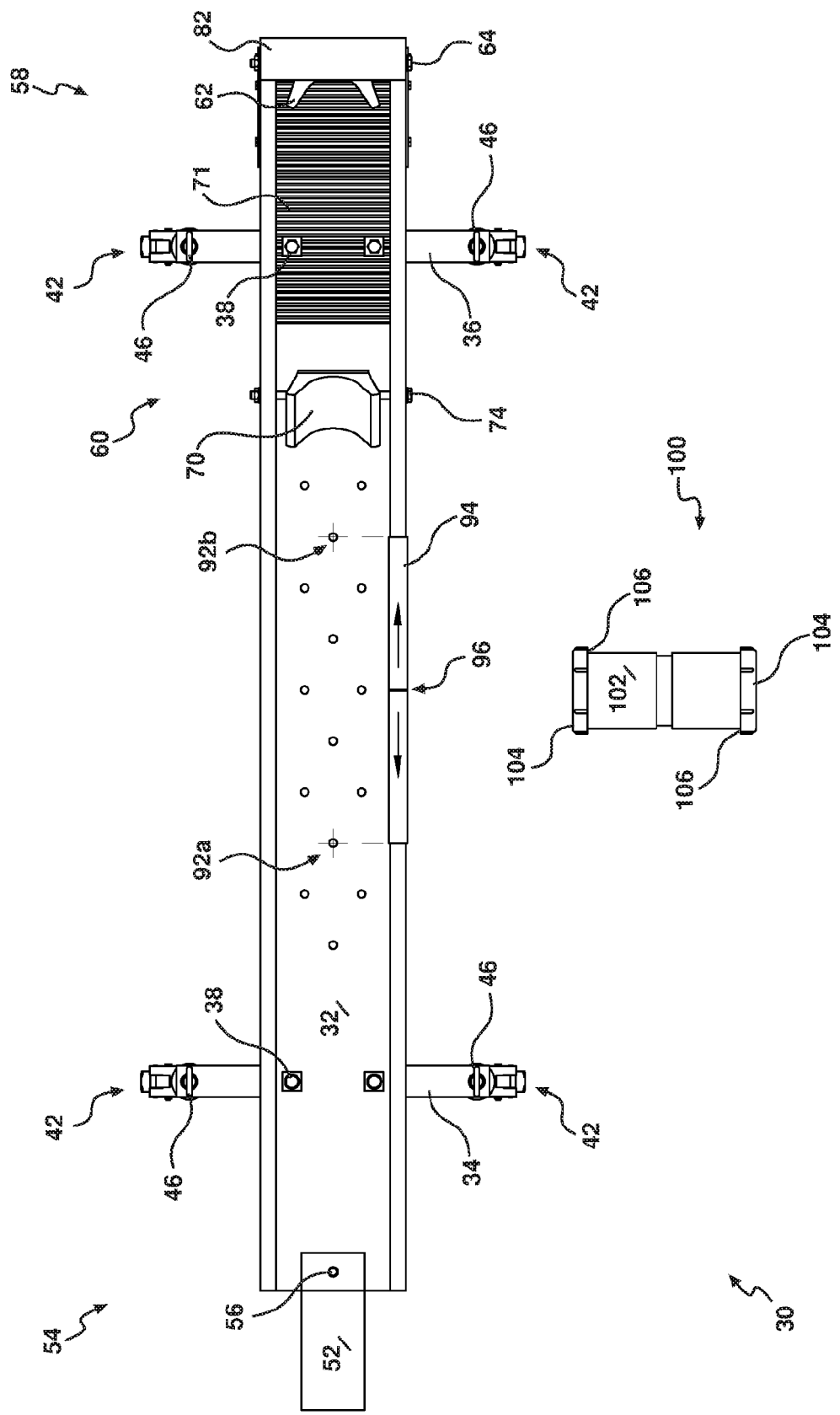
FIG. 5 is a top view of the dolly with guide member attached and centre point device of FIG. 3.

As illustrated in FIG. 3, the apparatus 10 further includes a guide member 94 that can be clipped over an edge of the upwardly open channel 72, such that it is slidable thereal- ong, as indicated by the arrows in FIG. 5. The guide member 94 has a centre marking 96 and a length 98 that equals the distance between the secondary holes 25a or 25b through the adjacent lifting tines 24. In one embodiment, the length is 525 mm, however the reader will appreciate that other length guide members could be used depending upon the distance between the secondary holes 25a or 25b.

As indicated in FIG. 5, the ends of the guide member 94 indicate which primary holes 92a and 92b, should be used to align with the secondary holes 25a or 25b in the respective lifting tines 24.

The apparatus 10 further includes a centre point device 100 comprising a cylindrical roller portion 102 and disc shaped ends 104 being larger than the cylindrical roller portion 102. In this way when the plank 32 is positioned on the cylindrical roller portion 102 the shoulder 106 engages with respective vertical sides of the plank 32. The shoulders 106 of the centre point device 100 ensure corrected placement under the plank 32 and inhibits the centre point device 100 from rolling sidewardly out from under the dolly 30. The reader will appreciate that the opposite ends of the centre point device 100 may simply be enlarged to inhibit disengagement from under the plank 32.

The guide member 94 is used in conjunction with the centre point device 100 to determine which of the plurality of primary holes 92 are to be used to coaxially align the secondary holes 25a or 25b to be used to attach the plank 32 of the dolly 30 to the lifting tines 24.

In the present embodiment, as illustrated in FIG. 3, the apparatus 10 further includes placement brackets 110 including a plurality of holes 112 to assist in aligning the primary and secondary holes 25a or 25b, 92, as will be described with respect to FIG. 12. In the present embodiment, the brackets 110 are held in place by bolts 114 that pass through holes 112 and apertures 25a or 25b in the respective lifting tines 24.

Figure 7:
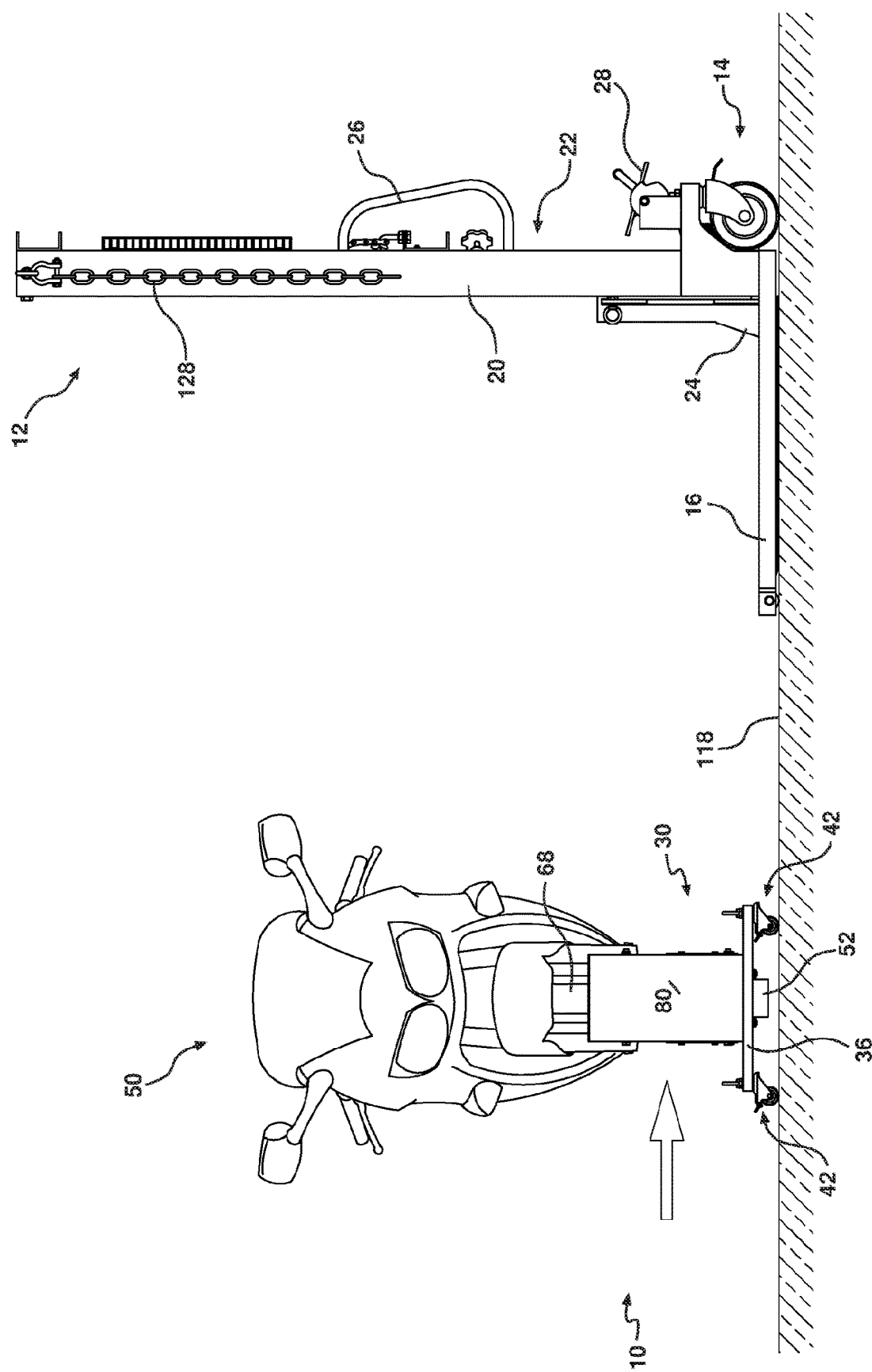
FIG. 7 is a side view of FIG. 6, illustrating the motorbike positioned on the dolly and adjacent lift device.
Figure 8:
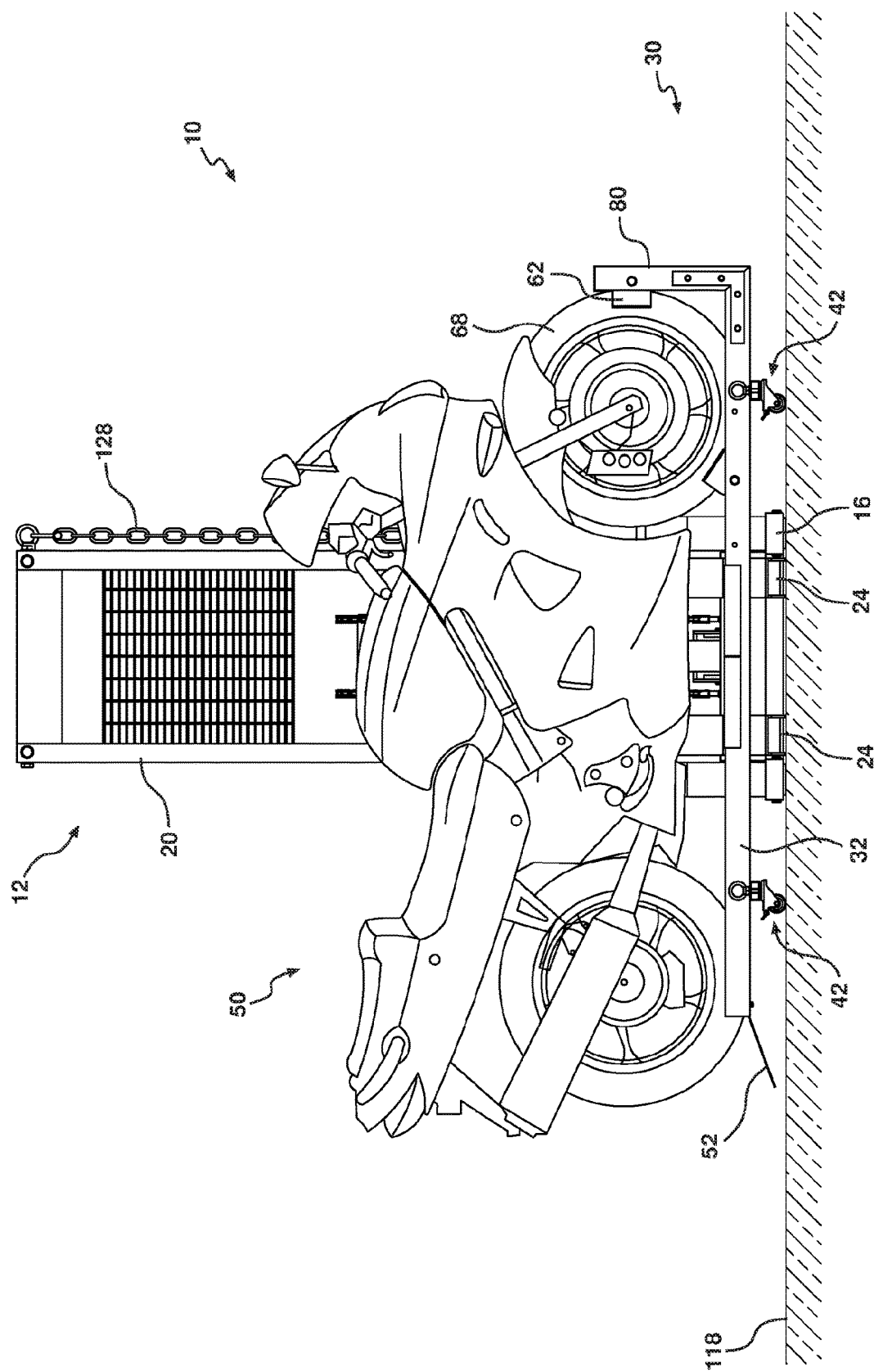
FIG. 8 is a front view of FIG. 7, illustrating the motorbike and dolly positioned over the tines of the lift device.

FIG. 7, illustrates the step in using the apparatus 10, wherein the dolly 30 is positioned in front of the lifting jack 12. The dolly 30 is then moved in the direction of the arrow in FIG. 7 such that it is positioned over the top of the lifting tines 24, as illustrated in FIG. 8.

Figure 9:
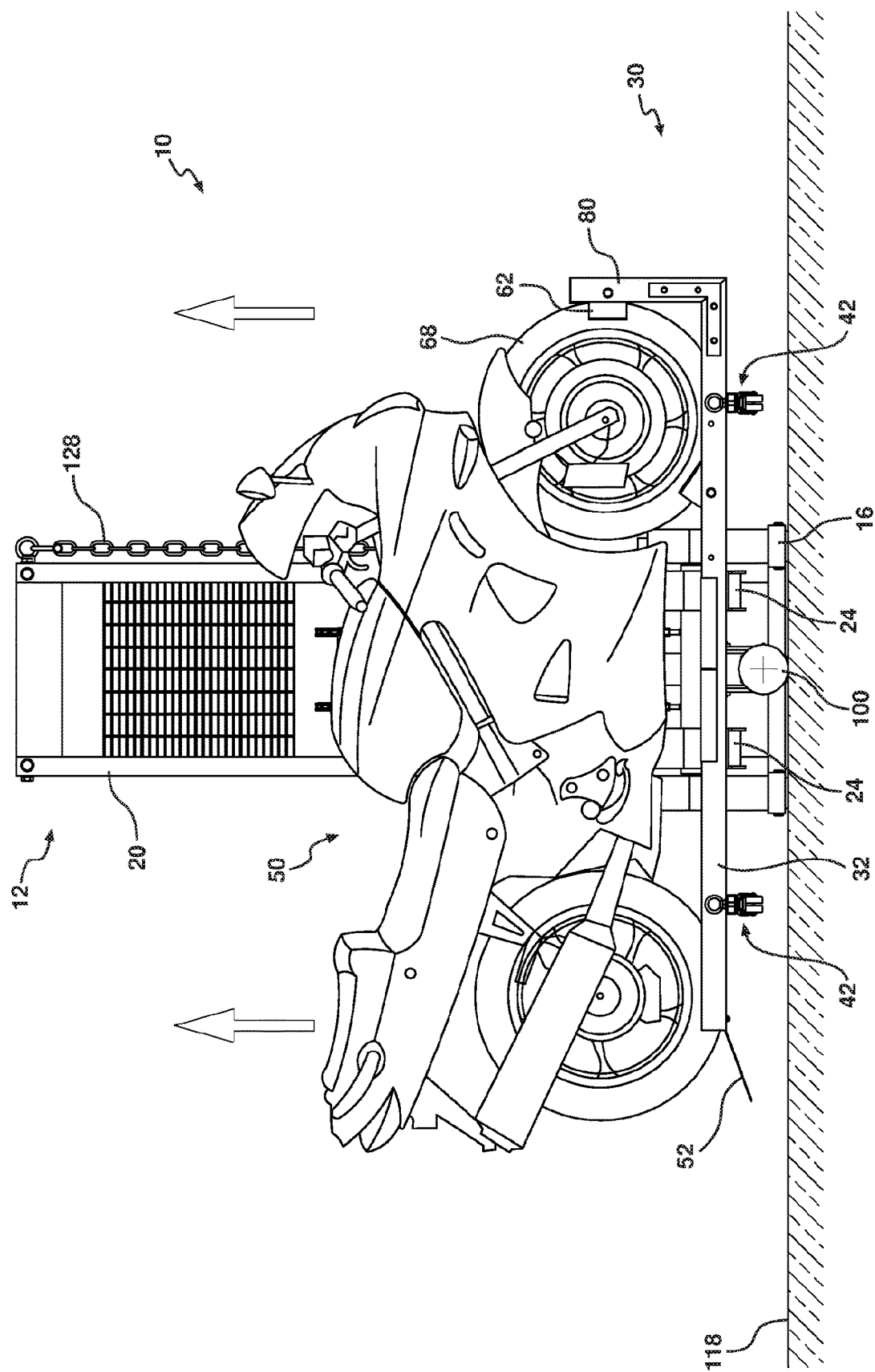
FIG. 9 is the front view of FIG. 8, illustrating the tines of the lifting jack engaging and lifting the dolly and motorbike.

The lifting tines 24 are then operated to raise the dolly 30 and motorbike 50 off the ground 118, as indicate by the arrows in FIG. 9, such that the caster wheels 44 are spaced apart from the ground 118. The centre point device 100 can then be placed directly under the plank 32 in approximately the central region of the elongate length of the plank 32.

Figure 10:
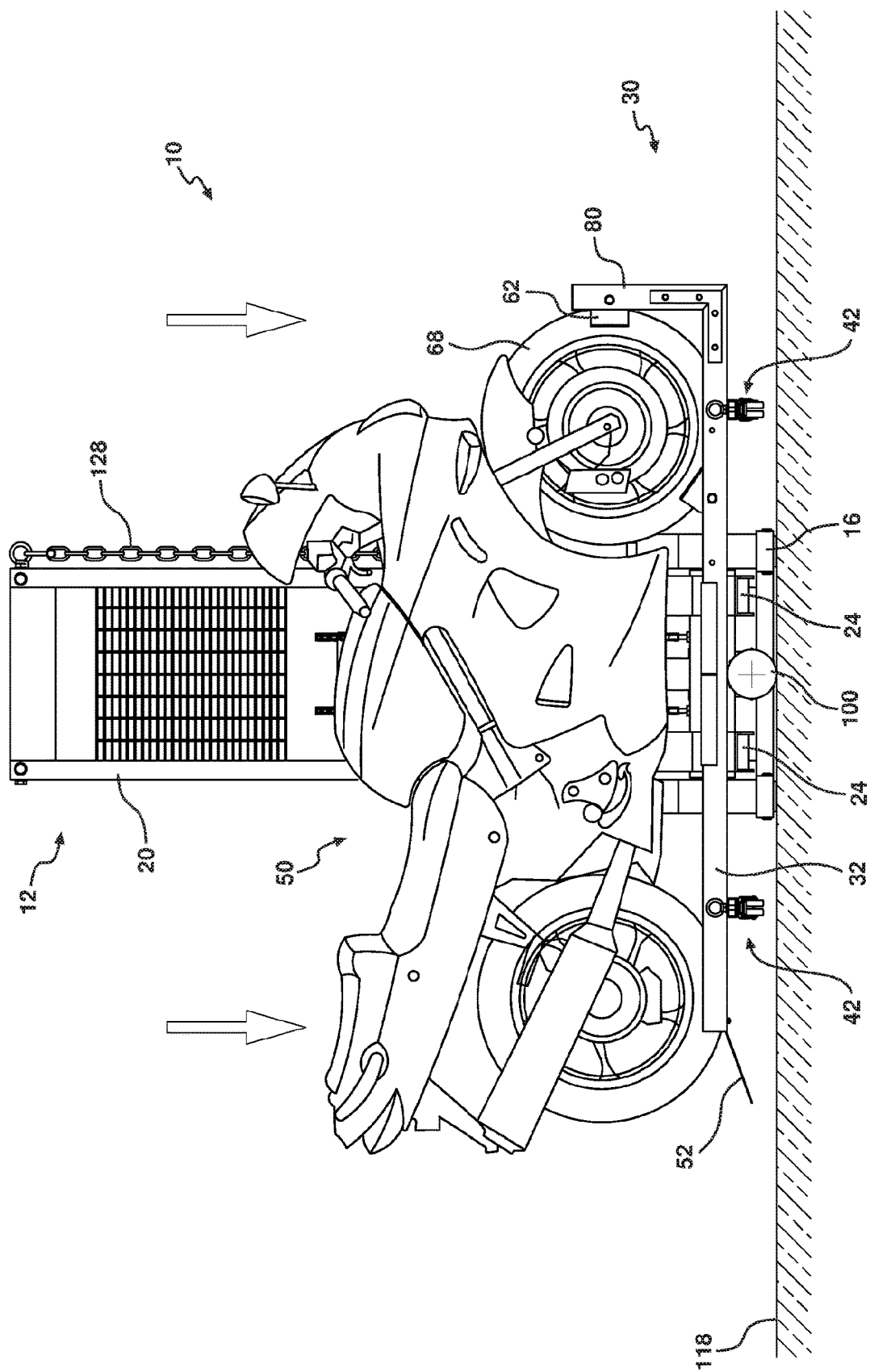
FIG. 10 is the front view of FIG. 9, illustrating the tines of the lifting jack in a lowered position and the dolly resting on the centre point device.

The centre point device 100 is then placed under the plank 32 and the lifting tines 24 are operation to lower the dolly 30, as indicate by the arrows in FIG. 10, such that the plank 32 is supported on the centre point device 100. The dolly 30 with bike attached thereto can then be moved backwards and forward until the weight is evenly distributed on either side of the centre point device 100, as illustrated in FIG. 11.

Figure 11:
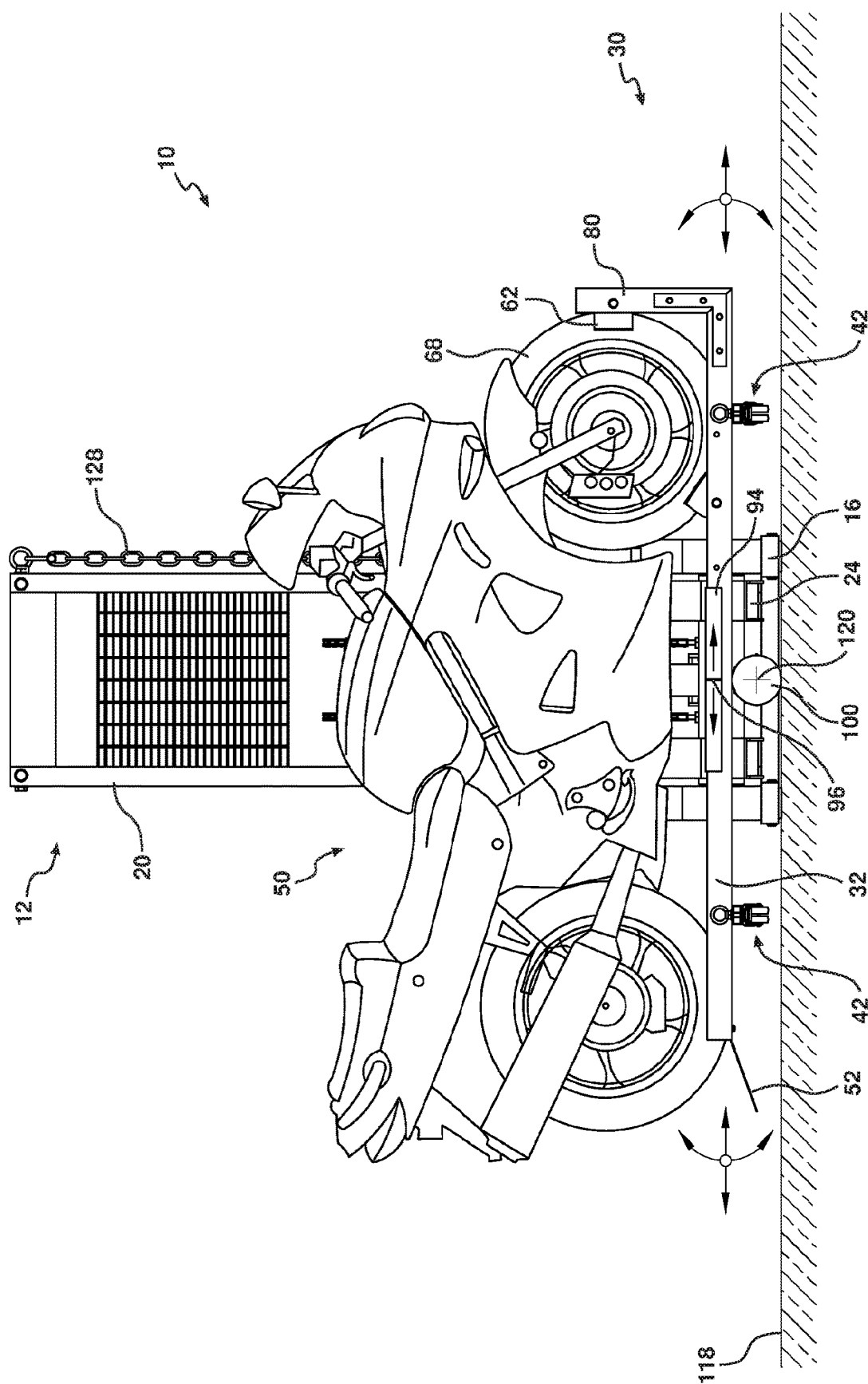
FIG. 11 is the front view of FIG. 10, illustrating the repositioning of the dolly such that the weight is evenly distributed and movement of the guide member.

The guide member 94 can then be moved longitudinally in the direction of the arrows along the plank 32, as indicated in FIG. 11, such that the centre line 96 aligns and is positioned vertically above, the axis of rotation 120 of the centre point device 100.

The lifting tines 24 can then be used to again raise the dolly 30 to remove the centre point device 100 and then lowered again such that the motorbike 50 can be wheeled off the plank 32, if required. As illustrated in FIG. 12, the brackets 110 can then be attached to the lifting tines 24 to assist in aligning the primary holes 92a, 92b, which are select because they are adjacent ends of the guide member 94, with the underlying secondary holes 25a or 25b in the lifting tines 24. The attachment of the brackets 110 means that the side of the plank 32 can be pushed up against the vertical portion of the bracket 110, such that the plank 32 can be moved sidewards, backwards and forwards, to align the primary and secondary holes 92, 25a or 25b. The reader should however appreciate that the use of the bracket 110 is not essential.

Figure 12:
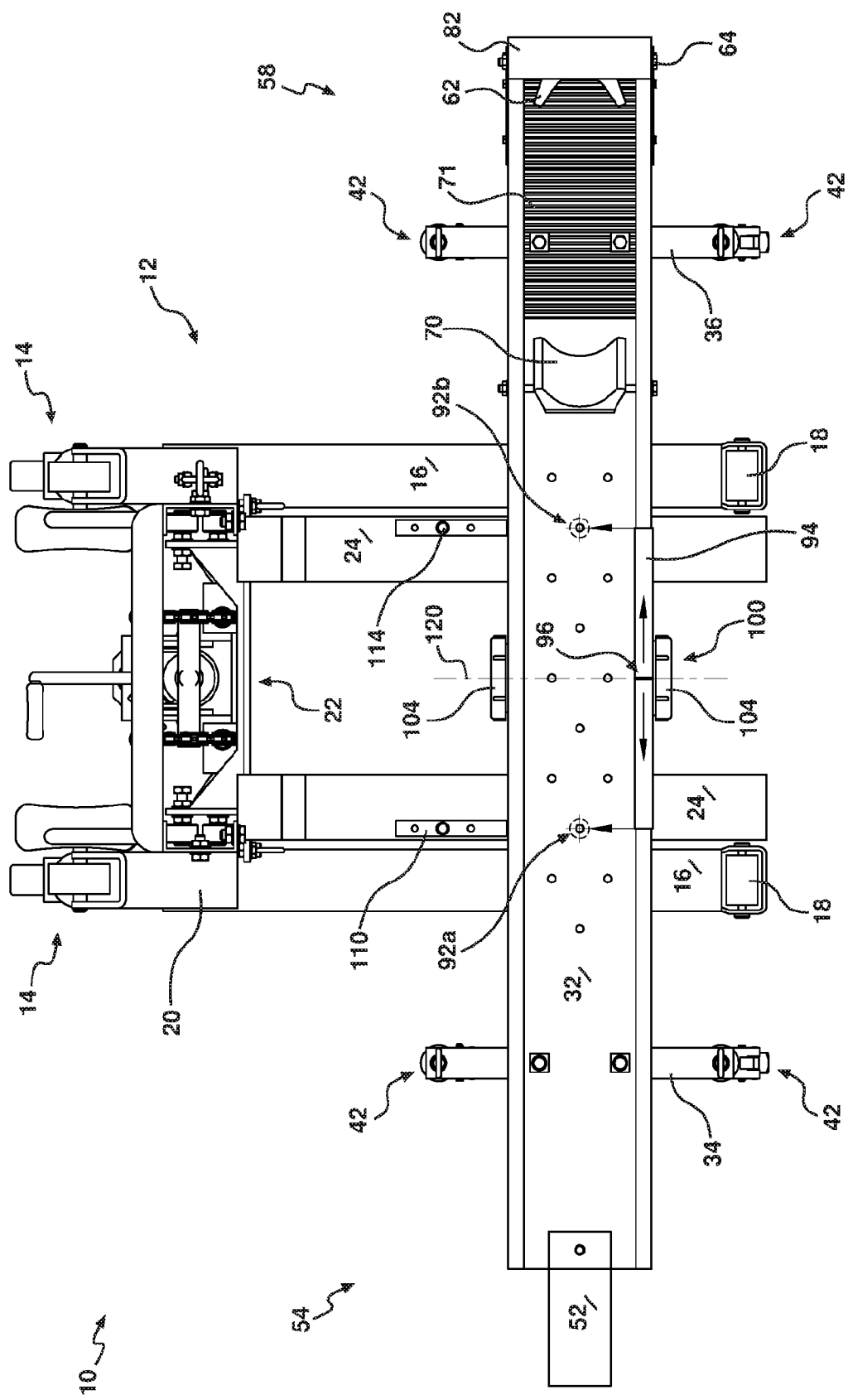
FIG. 12 is a top view of the dolly of FIG. 11, with bike removed, illustrating the selection of the appropriate fixing holes.

FIG. 12 also illustrates the position of the axis of rotation 120 of the centre point device 100, which aligns the centre line 96 of the guide member 94. FIGS. 13 and 14 illustrate the use of bolts 122 to fix the plank 32 to the lifting tines 24. It will be appreciated that if a different motorbike is to be stored or the weight distribution of the motorbike changes, due to variation in fuel within the tank or the addition/removal of accessories, the bolts 122 can be removed and the centre point reassessed using the above method.

As illustrated in FIGS. 15 to 17, ratchet straps 48 can be used to secure the motorbike 50 to tie-down eyelets 46. Furthermore, ratchet straps 48 may also be used to secure the motorbike 50 to tie-down eyelets 124. These ratchet straps 48 assist in keeping the motorbike 50 upright and engaged with the wheel engaging member 60.

Figure 18:
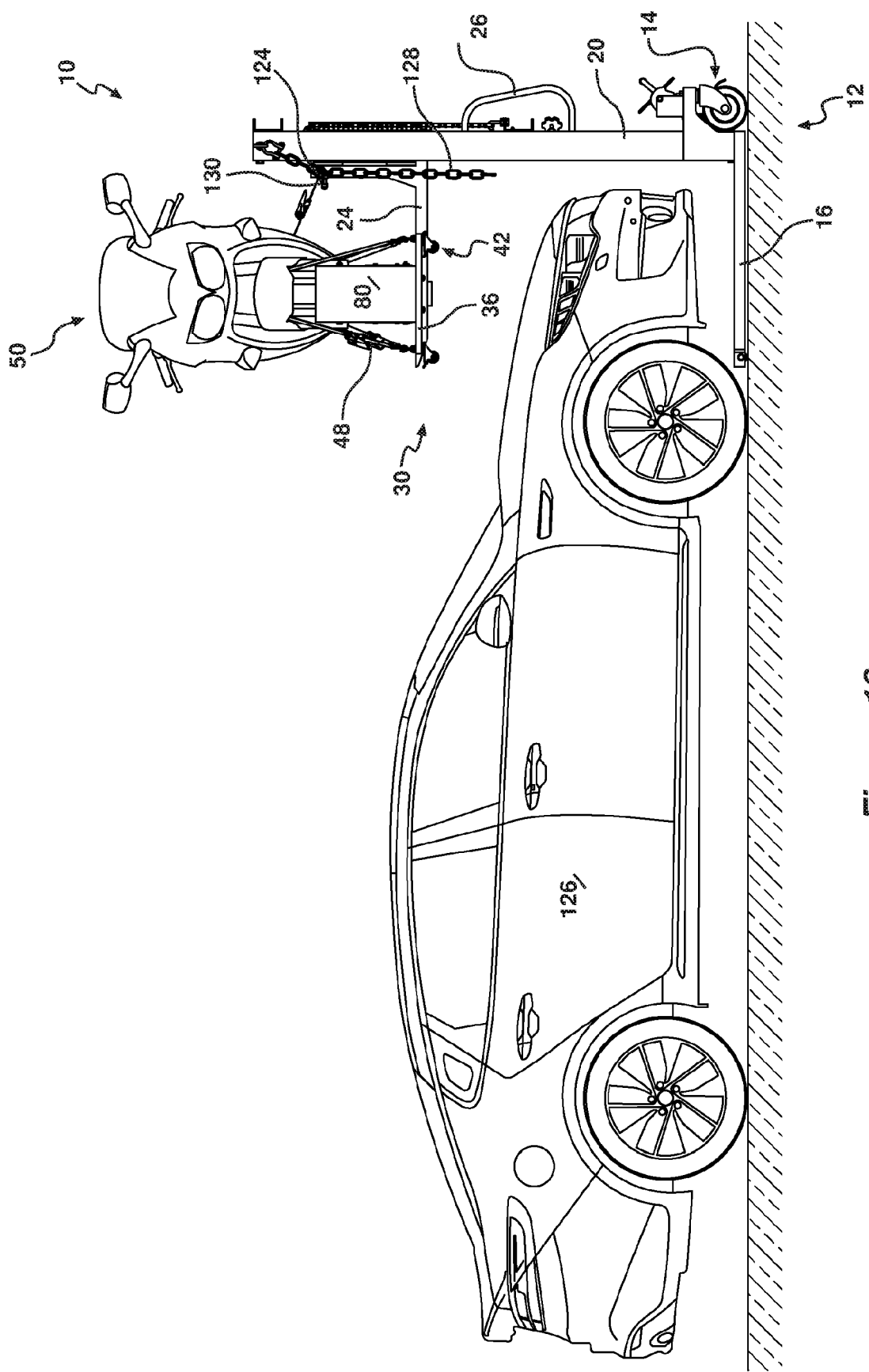
FIG. 18 is a side view of the apparatus of FIG. 17, illustrating the lifting jack in a raised arrangement with a vehicle partly positioned under the raised dolly and motorbike.

The caster wheels 14 are then locked using the brake actuator 28, to prevent it being moved when the vehicle is in the raised position. The lifting jack 12 can then be used to raise the motorbike 50 to a height above the ground, wherein a part of a vehicle 126 can be positioned under the raised motorbike, as illustrated in FIG. 18. Alternatively, another motorbike 50a positioned on a respective dolly 30a can be moved under the raised motorbike 50, as illustrate in FIG. 19. A fluid catchment tray/s (not shown) can be placed between the bottom of the motorbike 50 and underlying motorbike 50a to prevent oil or other fluids dropping onto the motorbike 50a, or articles stored therebelow.

The space under the raise motorbike 50 can also be used to store any other appropriately sized object.

Figure 19:
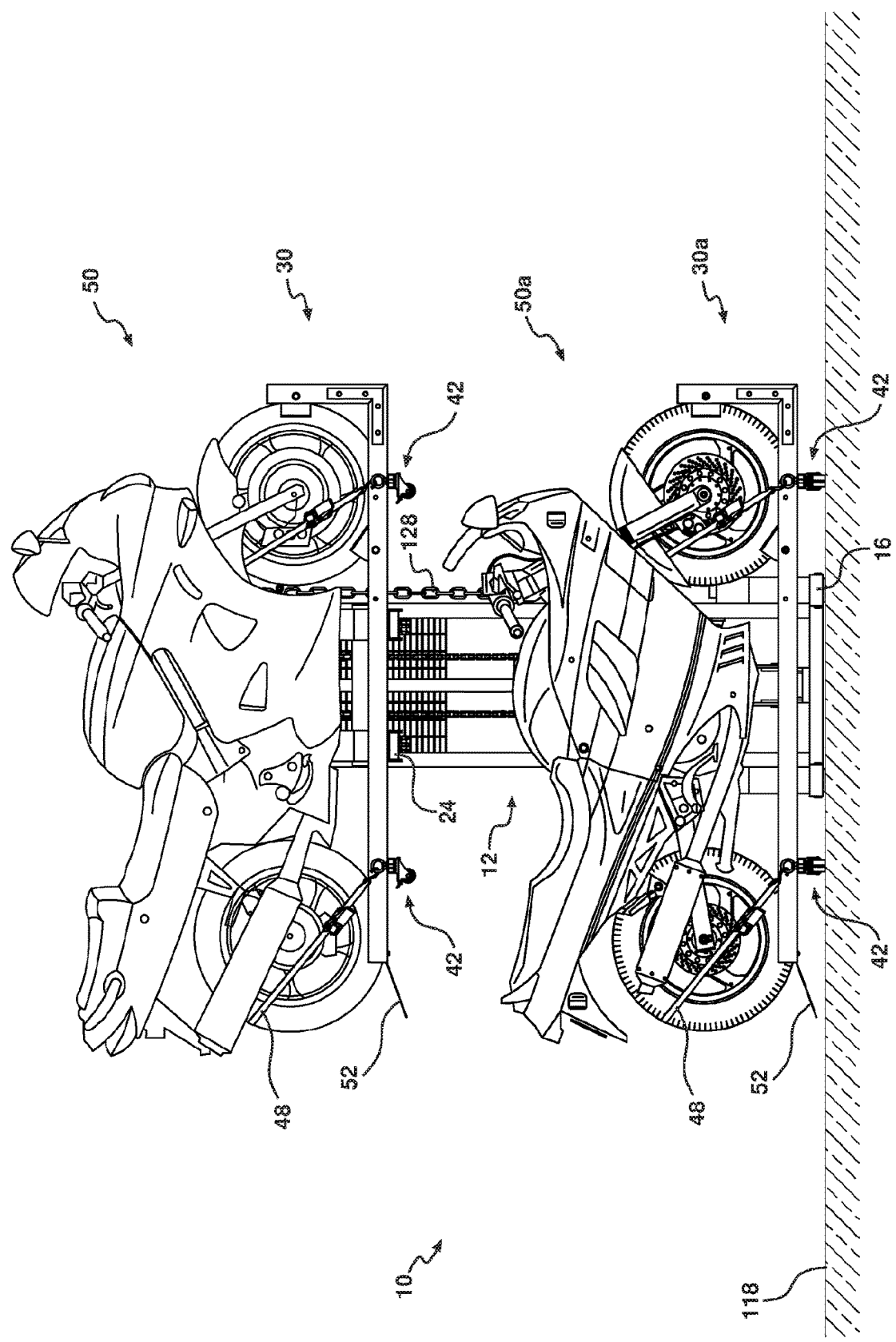
FIG. 19 is a front view of the apparatus illustrating two motorbikes stacked one above another, and supported on a respective dolly.

The reader will also appreciate that the centre point device 100 is used to determine the approximate longitudinal centre of gravity of the dolly 30 with the motorbike 50 positioned thereon. Accordingly, the dolly 30 can be affixed to the lifting tine 24 such that the weight is distributed evenly to inhibited the apparatus 10 from tipping when in a raised arrangement, as illustrated in FIGS. 18 and 19.

FIG. 18 also illustrates the jack safety chain 128 attached to the eyelet 124 using a shackle 130, to thereby prevent the unauthorised lowering of the lifting tines 24.

Figure 22:
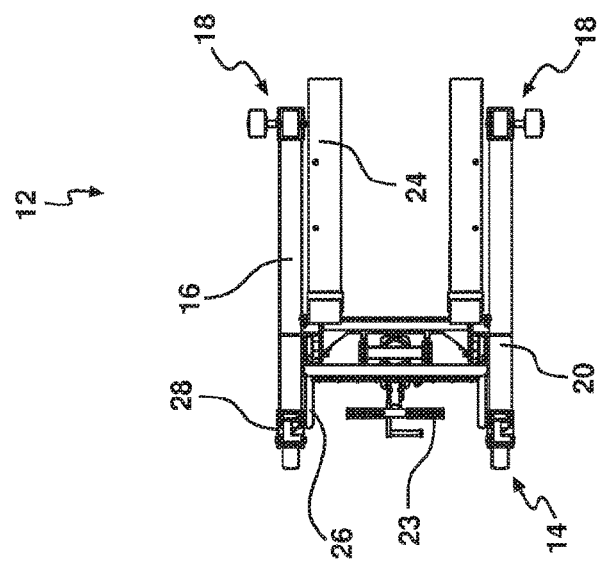
FIG. 22 is a top view of the lifting jack of FIG. 20.
Figure 21:
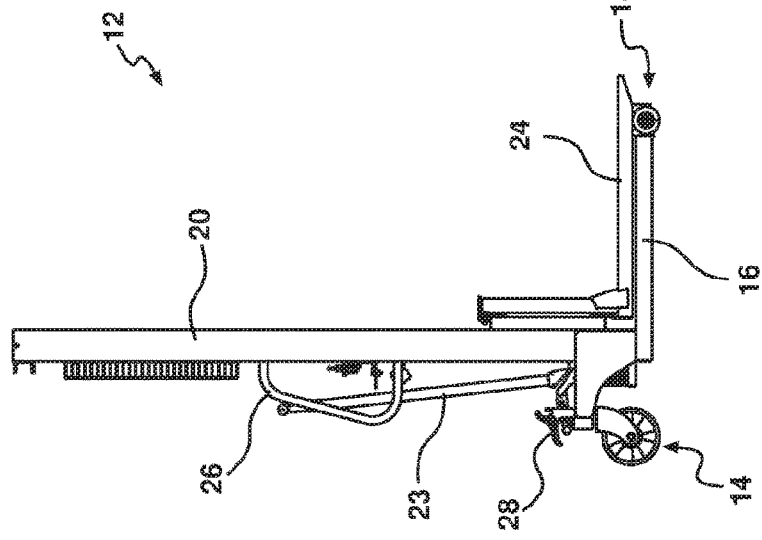
FIG. 21 is a side view of the lifting jack of FIG. 20.
Figure 20:
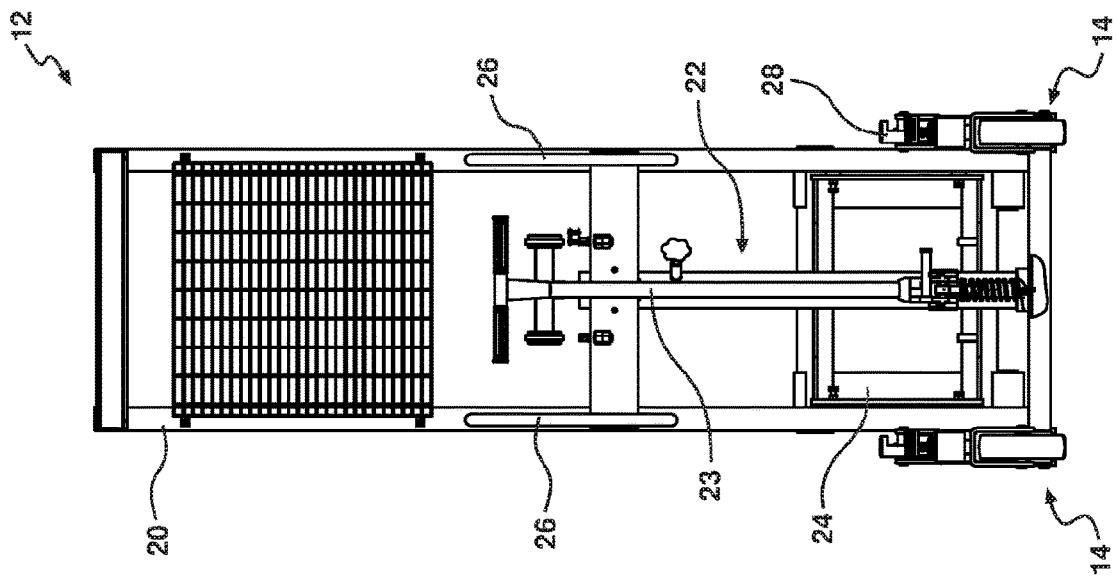
FIG. 20 is a rear view of another embodiment of the lifting jack.
Figure 24:
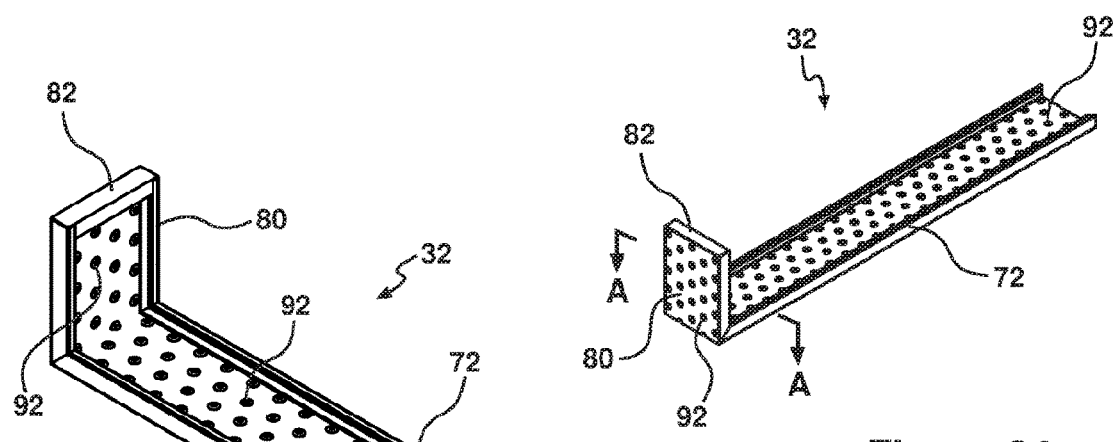
FIG. 24 is a reverse perspective view of the plank of FIG. 23.

FIGS. 20 to 22 illustrate a preferred embodiment of the lifting jack 12 with an elongate handle actuator 23 of the lifting mechanism 22.

Figure 25:
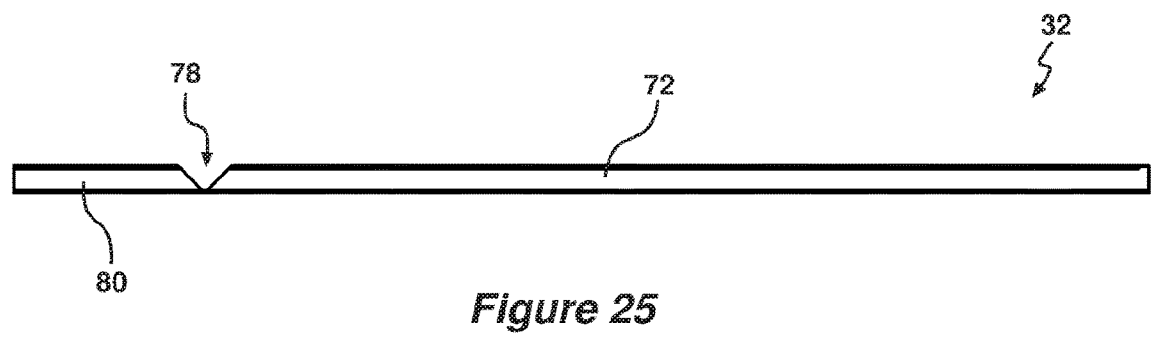
FIG. 25 is a side view of the plank of FIG. 23, illustrating the configuration prior to folding.
Figure 26:
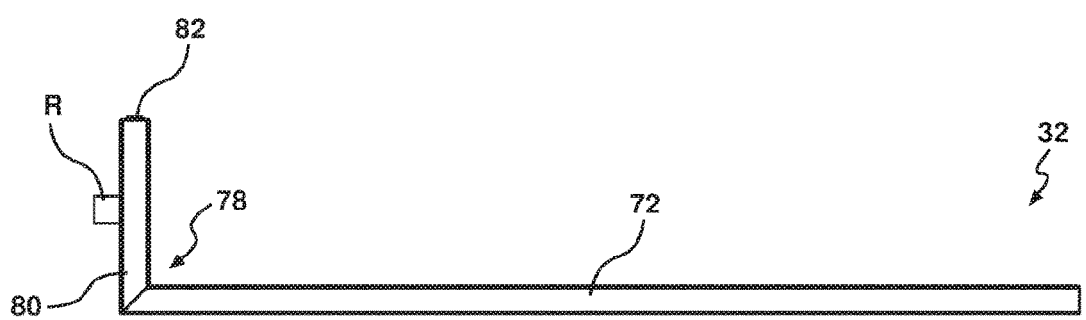
FIG. 26 is a side view of the plank of FIG. 23, after folding.

The plank 32, as illustrated in FIGS. 24 to 29, may be formed by bending a length of steel having a plurality of primary holes 92, extended therethrough. As illustrated in FIG. 25 the length of steel, which may be 2500 mm in length, is cut at 78 to enable bending. The sides of the upwardly open channel 72 are cut in a V-shape and then folded to form the L-shaped plank 32, as illustrated in FIG. 26.

Figure 23:
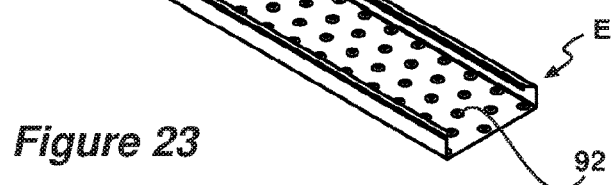
FIG. 23 is a perspective view of another embodiment of the plank of the dolly.

The sides of the upwardly open channel 72 at the entry point E or start of plank 32, as illustrated in FIG. 23, are cut at 45 degree on the side stiffener walls to inhibit damage to the bike tyres when loading the bike onto the plank 32.

The overall plank 32 length of the of the present embodiment of the folded device, as illustrated in FIG. 26 is in the present embodiment 2080 mm. This length of the plank 32 accommodates a range of different length bikes and when a bike is positioned on the plank 32 both front and rear wheels are not going over the elevation at points 52 and 70 at the same time. The usable length is reduced by the rearwardly open support member 62, which in a preferred embodiment is a large rubber chock, to a length of 2018 mm. Although, the reader will appreciate that other length planks 32 are possible.

As further illustrated in FIG. 26, a rubber stop R may be attached to the leading edge of the vertical end stop 80. The rubber stop R is used as a rest for abutment against a wall or other vertical surface, and assists a user when loading a bike onto to the plank 32, since it inhibits the unit from moving forwards.

Figure 27:
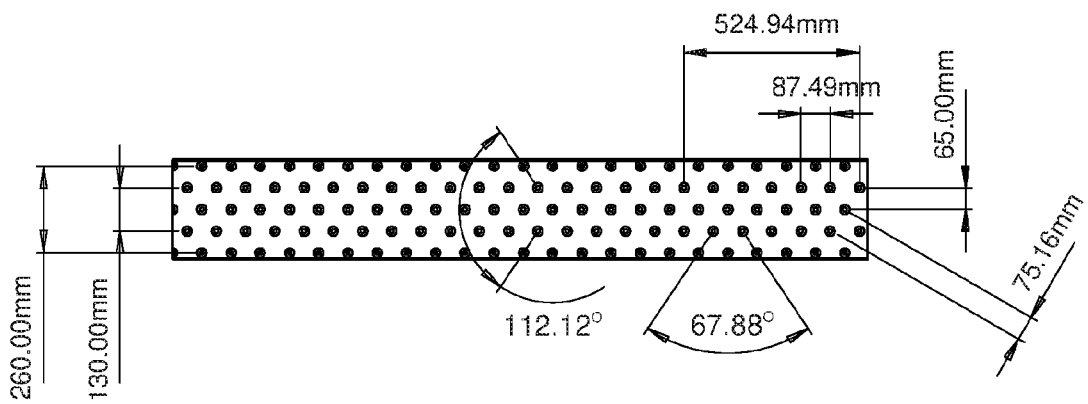
FIG. 27 is an underside view of the plank of FIG. 23, illustrating the position of the holes.
Figure 28:
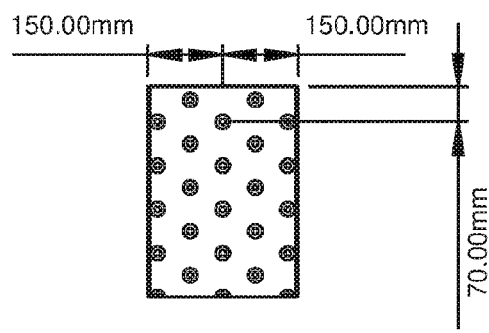
FIG. 28 is an end view of the vertical end stop of the plank of FIG. 23 illustrating the position of the holes.
Figure 29:
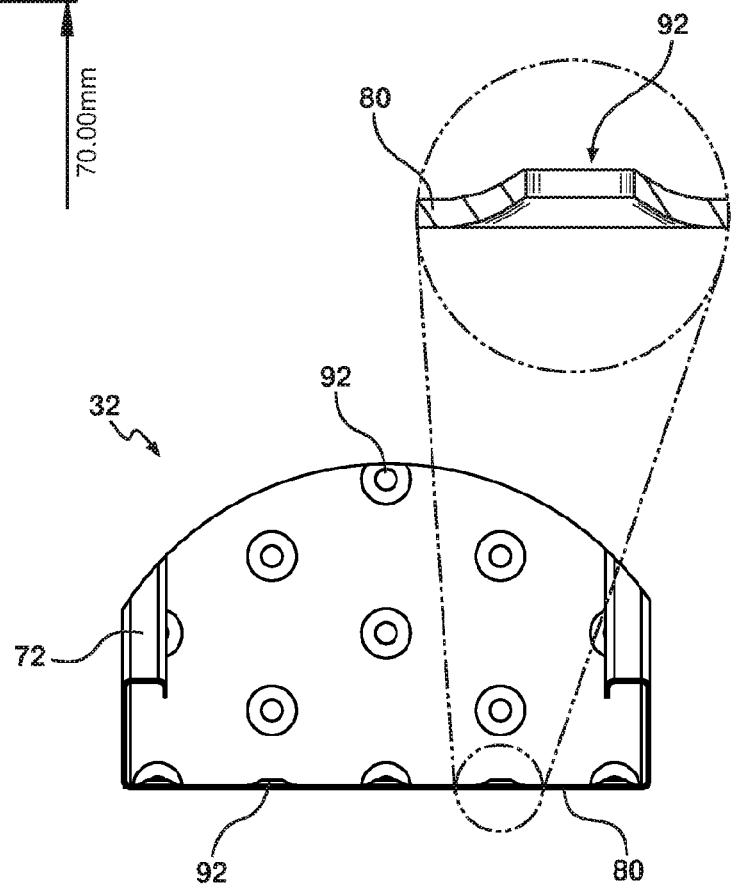
FIG. 29 is a cross-sectional view through A-A of the plank of FIG. 24, illustrating the configuration of the holes.

As illustrated in FIGS. 27 to 29, the plurality of primary holes 92 extend through the plank 32. The number of holes 92 and configuration of the preferred embodiment enable the plank 32 to use used on various sizes and configuration of bikes.

The width of the plank 32 in one embodiment is 300 mm overall and 250 mm inside diameter between the inner edges of the upwardly open channel 72, as illustrated in FIG. 29.

Four large 12 mm threaded eyelet bolts may be secured through selected holes 92 on either side of the wheel to hold the bottom edge of the front wheel of the bike as part of the wheel holding or locking mechanism.

As further illustrated in FIGS. 27 and 28, the hole pattern of the plank 32 has been designed to give a range of movement and adjustment positions while sitting on the lifting blades or tines in or out, this is to maximise the length on blades to accommodate two planks. Furthermore, the design of the hole pattern is so that once a user has used the centre point device 100, while a bike is mounted on the plank 32, the user is able to mark the centre point on the plank 32 then using the measuring device component which equals 6×87 mm, the distance between each hole on the plank longitudinal is 522 mm which is the same distance as that between the holes 25 drilled and tapped in the lifting blades 24. This means there are many securing points while lifting the bike to ensure a balanced weight distribution while elevated. The different degrees outlined in the drawings are done so that the holes will fit on the plank leaving spacing on the outer edges to accommodate a bolt so as not to hit the stiffener walls of the plank 32.

As illustrated in FIG. 29, the 12 mm holes 92 are stamped and angled upwardly or inwardly that is slightly raised by around 3 mm. This is done to trap any small amounts of fluids, oils or fuel on the horizontal portion of the plank 32 and to inhibit them from draining onto the bike/vehicle underneath, to thereby protect them from damage. The reader will appreciate that the hole illustrated in FIG. 29 is positioned on the vertical end stop 80, however they will appreciate that the holes 32 on the horizontal portion of the plank 32 are similarly configured.

Figure 30:
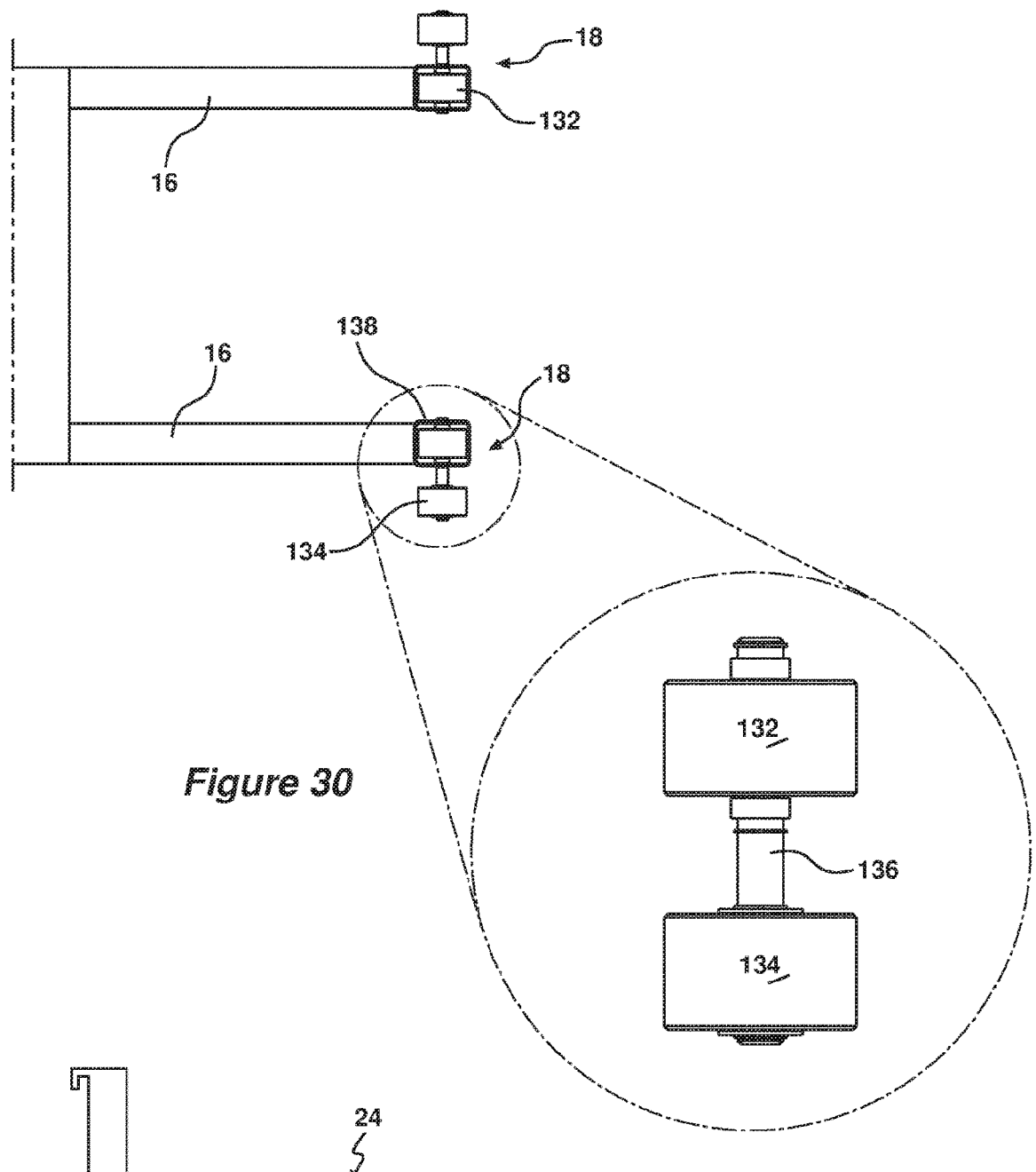
FIG. 30 is a partial top view of the ground engaging members of the lifting jack of FIG. 20, illustrating an enlargement of the roller configuration.
Figure 31:
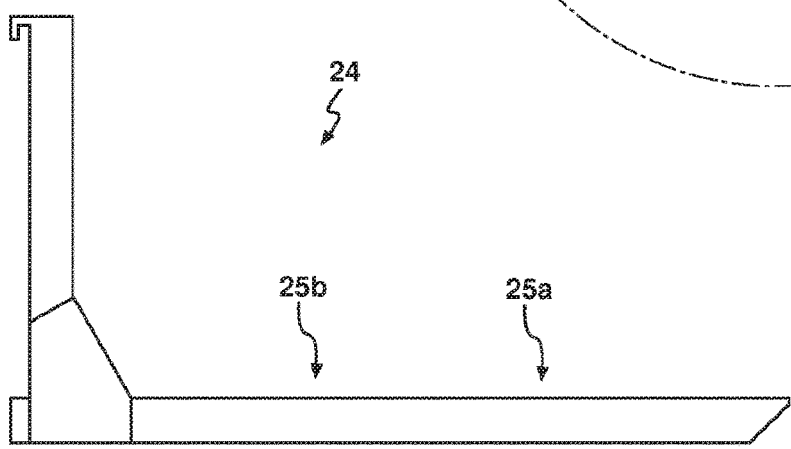
FIG. 31 is a side view of the lifting tines of the lifting jack of FIG. 20.
Figure 32:
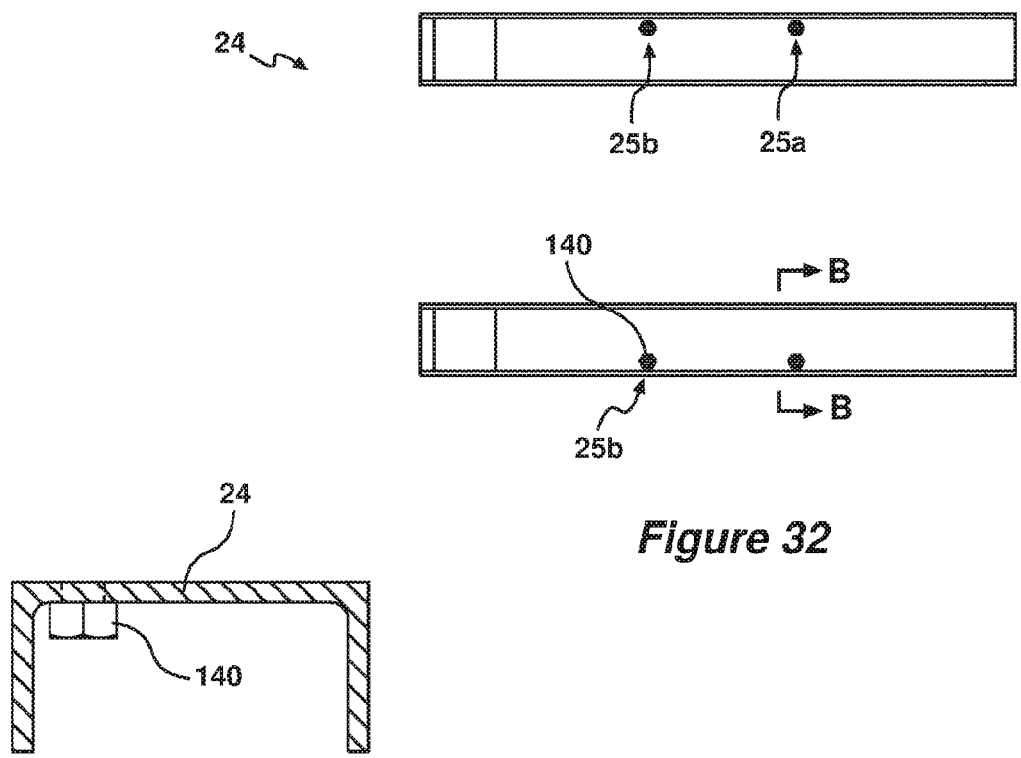
FIG. 32 is an underside view of the lifting tines of FIG. 31, illustrating the position of the plank fixing holes and corresponding nuts.
Figure 33:
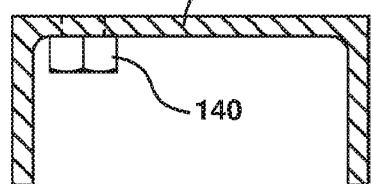
FIG. 33 is a cross-sectional view through B-B of the lifting tines of FIG. 32.

FIG. 30 illustrates an alternate embodiment of the ground engaging members 16, having rollers 18 comprise a pair of wheels 132, 134 mounted to an axle 136. The wheels 132 are retained within respective mounts 138 at the ends of the members 16. The wheels 134 are positions on outer sides of members 16 and are provided as outriggers to improve stability of the lifting jack 12.

The dolly 30 can also be used on its own to store and move the vehicle being stored thereon, wherein the vehicle, such as a bike can be rotated horizontally around 360 degrees with the bike securely attached to the dolly 30.

Figure 34:
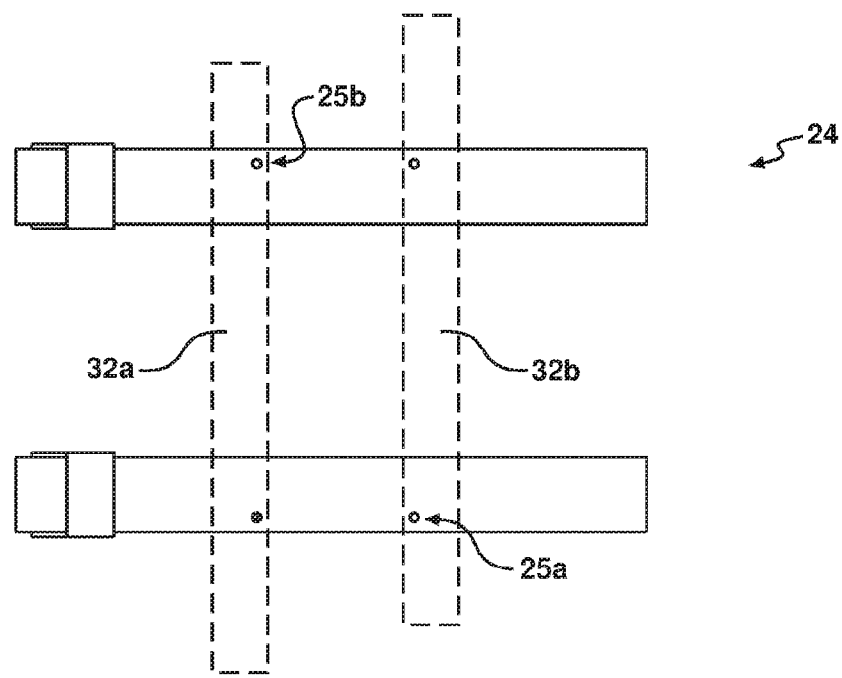
FIG. 34 is a top view of the lifting tines of FIG. 31, indicating the attachment of two adjacent planks for supporting respective bikes thereon.

FIGS. 31 to 34 illustrate another embodiment of the spaced apart lifting tines 24, illustrating the position of the nuts 140 for securing the plank 32 thereto. FIG. 34, further illustrates the positioning of two planks 32*a* and 32*b* on a single pair of lifting tines 24, for holding respective bikes thereon in a side by side arrangement. The skilled addressee will now appreciate the advantages of the illustrated invention over the prior art. In one form the present invention provides a means for storing a vehicle, such as a motorbike, at a height above the ground. As the reader will appreciate, this has significant advantage where space is at a premium, such as in a car garage or storage locker, or where multiple bikes are being stored. The reader will appreciate that the apparatus can be used to store other vehicles, such as but not limited to, jet skis and other personal watercraft (PWC).

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. A vehicle storage apparatus, including:
   a lifting jack having spaced apart lifting tines;
   a dolly being reversibly couplable to the lifting tines in a number of alternate positions; and
   a centre point device for determining a weight distribution along a longitudinal axis of the dolly when a vehicle is located thereon, to assist in a selection of one of said number of alternate positions for a suitable attachment of the dolly to the lifting tines, to thereby inhibit tipping of the lifting jack when the lifting tines are in a raised position or otherwise dislodgement of the vehicle stored thereon, wherein the dolly being movable laterally relative to the lifting jack and reversably couplable to the lifting tines, once a longitudinal centre point of the dolly and vehicle is determined.

2. The vehicle storage apparatus in accordance with claim 1, wherein the dolly being couplable to the lifting tines, using a nut and bolt that are engageable through co-axially alignable primary holes, or a clamp mechanism or a clip may be provided such that the dolly can be coupled to, or couplable to the lifting jack in a variety of positions depending upon the weight distribution of the vehicle being supported on the dolly.

3. The vehicle storage apparatus in accordance with claim 2, wherein a guide member is slidably coupled to or configured to engage with the dolly and being used in conjunction with the centre point device to determine which of a plurality of primary holes extending through the dolly are to be used to coaxially align with a secondary hole through one of said lifting tines.

4. The vehicle storage apparatus in accordance with claim 3, wherein the dolly plan includes an upwardly open channel and the guide member clips over an edge of the upwardly open channel and being configured to slide therealong.

5. The vehicle storage apparatus in accordance with claim 2, wherein the centre point device comprises a roller having ends being enlarged to abut or be positioned adjacent respective sides of the dolly, to thereby inhibit the centre point device from rolling sidewardly out from under the dolly when in use.

6. The vehicle storage apparatus in accordance with claim 1, wherein the dolly and centre point device are separate components.

7. The vehicle storage apparatus in accordance with claim 1, wherein the dolly and centre point device are unitary in construction.

8. The vehicle storage apparatus in accordance with claim 1, wherein the lifting jack may be a mobile unit having lockable caster wheels, ground engaging members with rollers, a vertical frame and lifting mechanism for raising the spaced apart lifting tines, or the lifting jack comprises a frame attachable to a wall or other vertical support, and lifting tines movably connected thereto.

9. The vehicle storage apparatus in accordance with claim 1, wherein the dolly comprises a plank being affixed to two spaced apart cross members, each cross-member includes a caster wheel assembly or slider at each end thereof, such that the plank is effectively supported on four caster wheels or sliders, each cross-member further including tie-down eyelets for an attachment of ratchet straps or the like, to assist in securing the vehicle when being stored.

10. The vehicle storage apparatus in accordance with claim 9, wherein the plank includes a detachable ramp at a first end, and a wheel engaging member at an opposite second end, adjacent a vertical end stop.

11. A method of storing a motorbike or vehicle, including a plurality of steps of:
   providing a vehicle storage apparatus in accordance with claim 1;
   positioning the motorbike or vehicle on the dolly;
   lifting the dolly using the lifting tines of the lifting jack;
   positioning the centre point device under the dolly;
   lowering the dolly using the lifting tines of the lifting jack until the dolly rests on the centre point device;
   moving the dolly in a longitudinal direction to determine generally the centre point or fulcrum of the motorbike or vehicle and dolly, such that the weight is even distributed on either side of the centre point device;
   marking or otherwise noting the centre point or fulcrum and other related measurements on the dolly;
   lifting the dolly off the centre point device using the lifting jack; removing or moving the centre point device; and
   using the markings of the centre point or other related measurement, to fix the dolly to the lifting tines of the lifting jack, such that when the dolly and motorbike or vehicle are raised by the lifting jack the vehicle storage apparatus is inhibited from tipping or otherwise dislodgement of the motorbike or vehicle stored thereon.

12. The method in accordance with claim 11, further including a step of securing the motorbike or vehicle to the dolly, using at least one wheel engaging member, and/or clamps, and/or straps and/or other reversible attachable member for holding the motorbike or vehicle in place relative to the dolly.

13. The vehicle storage apparatus in accordance with claim 1 being a motorbike storage apparatus.

14. The vehicle storage apparatus in accordance with claim 13, including:
  the dolly having a plurality of generally vertical primary holes extending therethrough, the dolly being supportable on wheels or slides, and configured to hold a motorbike thereon;
  the lifting jack including spaced apart lifting tines, each of the lifting tines including at least one generally vertical secondary hole extending therethrough; and
  the centre point device, being configured to selectively support the dolly thereon in a number of alternate positions, for use in determining the weight distribution along a longitudinal axis of the dolly, whereby at least two of the vertical primary holes are identified for coaxial alignment with respective secondary holes extending through the lifting tines, to thereby enable passage of a respective fixing means therethrough, wherein the dolly is fixedly connectable to the lifting tines to thereby provide a generally even distribution of weight to inhibiting tipping of said apparatus or otherwise dislodgement of the motorbike stored thereon.

* * * * *

UNITED STATES PATENT AND TRADEMARK OFFICE
CERTIFICATE OF CORRECTION

| | |
|---|---|
| PATENT NO. | : 12,384,477 B2 |
| APPLICATION NO. | : 18/040996 |
| DATED | : August 12, 2025 |
| INVENTOR(S) | : Danny Andrew Horvat |

It is certified that error appears in the above-identified patent and that said Letters Patent is hereby corrected as shown below:

In the Claims

Claim 5 should read:
5. The vehicle storage apparatus in accordance with claim 4, wherein the dolly includes an upwardly open channel and the guide member clips over an edge of the upwardly open channel and being configured to slide therealong.

Claim 12 should read:
12. The vehicle storage apparatus in accordance with claim 1, including:
    the dolly having a plurality of generally vertical primary holes extending therethrough, the dolly being supportable on wheels or slides, and configured to hold a motorbike thereon;
    the lifting jack including spaced apart lifting tines, each of the lifting tines including at least one generally vertical secondary hole extending therethrough; and
    the centre point device, being configured to selectively support the dolly thereon in a number of alternate positions, for use in determining the weight distribution along a longitudinal axis of the dolly, whereby at least two of the vertical primary holes are identified for coaxial alignment with respective secondary holes extending through the lifting tines, to thereby enable passage of a respective fixing means therethrough, wherein the dolly is fixedly connectable to the lifting tines to thereby provide a generally even distribution of weight to inhibiting tipping of said apparatus or otherwise dislodgement of the motorbike stored thereon.

Signed and Sealed this
Twenty-third Day of December, 2025

John A. Squires
*Director of the United States Patent and Trademark Office*